(12) United States Patent
Sekiya et al.

(10) Patent No.: US 8,292,043 B2
(45) Date of Patent: Oct. 23, 2012

(54) DISC BRAKE DEVICE

(75) Inventors: Yoshihide Sekiya, Susono (JP); Hiroshi Isono, Mishima (JP); Yoshiyuki Yamaguchi, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1148 days.

(21) Appl. No.: 12/159,816

(22) PCT Filed: Nov. 20, 2007

(86) PCT No.: PCT/JP2007/072881
§ 371 (c)(1),
(2), (4) Date: Jul. 1, 2008

(87) PCT Pub. No.: WO2008/062894
PCT Pub. Date: May 29, 2008

(65) Prior Publication Data
US 2009/0008193 A1 Jan. 8, 2009

(30) Foreign Application Priority Data
Nov. 20, 2006 (JP) ................................. 2006-313268

(51) Int. Cl.
*F16D 55/00* (2006.01)
(52) U.S. Cl. ............... 188/73.31; 188/73.35; 188/73.36; 188/73.38; 188/73.39; 188/205 A
(58) Field of Classification Search ............... 188/73.31, 188/73.35, 73.36, 73.38, 73.39, 205 A
See application file for complete search history.

(56) References Cited

U.S. PATENT DOCUMENTS

| 3,920,104 | A | | 11/1975 | Hoffman | |
|---|---|---|---|---|---|
| 5,109,959 | A | * | 5/1992 | Kondo et al. | 188/73.31 |
| 5,875,873 | A | | 3/1999 | Kay et al. | |
| 6,286,636 | B1 | * | 9/2001 | Iwata | 188/73.31 |
| 6,296,085 | B1 | * | 10/2001 | Yukoku | 188/73.36 |
| 6,478,122 | B1 | * | 11/2002 | Demoise et al. | 188/73.38 |

(Continued)

FOREIGN PATENT DOCUMENTS
DE  2 209 504  9/1973
(Continued)

*Primary Examiner* — Bradley King
*Assistant Examiner* — Mahbubur Rashid
(74) *Attorney, Agent, or Firm* — Oblon, Spivak, McClelland, Maier & Neustadt, L.L.P.

(57) ABSTRACT

A disc brake apparatus which can securely suppress clunking sounds not only at the time of forward braking of a vehicle but also at the time of back braking of the vehicle is provided. When a backing metal 6A of a brake pad 6 shifts toward a first torque receiving part 3C of a torque member 3 along with an operation for forward braking of the vehicle, a leading end part of a spring piece 9A engages one slope of an engaging projection 6E, so as to elastically press the backing metal 6A toward the first torque receiving part 3C, whereby the disc brake apparatus is held in a first contact state. When the backing metal 6A shifts toward a second torque receiving part 3D of the torque member 3 along with an operation for back braking of the vehicle, the leading end part of the spring piece 9A engages the other slope of the engaging projection 6E, so as to elastically press the backing metal 6A toward the second torque receiving part 3D, whereby the disc brake apparatus is held in a second contact state. As a result, the clunking sounds are suppressed not only at the time of forward braking of a vehicle but also at the time of back braking of the vehicle.

3 Claims, 23 Drawing Sheets

U.S. PATENT DOCUMENTS

| | | |
|---|---|---|
| 6,527,090 B1 | 3/2003 | Barillot et al. |
| 2008/0099287 A1 | 5/2008 | Severinsson |

FOREIGN PATENT DOCUMENTS

| | | |
|---|---|---|
| DE | 2 255 678 | 5/1974 |
| DE | 11 2006 001 595 T5 | 7/2008 |
| EP | 0 971 146 A2 | 1/2000 |
| GB | 2 066 911 A | 7/1981 |
| JP | 56 85736 | 7/1981 |
| JP | 64 14936 | 1/1989 |
| JP | 2000 27905 | 1/2000 |
| JP | 2001 336555 | 12/2001 |
| JP | 2002 250376 | 9/2002 |

* cited by examiner (a)

(b)

(c)

(a)

(b)

(c)

(d)

DISC BRAKE DEVICE

TECHNICAL FIELD

The present invention relates to a disc brake apparatus which is mounted as a braking apparatus to a vehicle, for example.

BACKGROUND ART

Disc brake apparatus have conventionally been known in general, in which rotor surfaces on both sides of a disc rotor are held by a pair of brake pads, while the rotary torque received by the brake pads from the rotor surfaces of the disc rotor is caught by a torque member (mounting), so as to obtain a braking force.

In such a disc brake apparatus, the brake pads typically have a structure in which a backing metal is joined to a pad member coming into frictional contact with the rotor surface of the disc rotor, while the backing metal has a first torque transmission part set at an end part to become the turning-out side during normal rotations (the turning-in side during reverse rotations) of the disc rotor and a second torque transmission part set at an end part to become the turning-out side during reverse rotations (the turning-in side during normal rotations of the disc rotor) of the disc rotor. Correspondingly, the torque member is provided with first and second torque receiving parts which receive the rotary torque from the disc rotor by opposing the first and second torque transmission parts of the backing metal of the brake pad, respectively.

Here, in order for the brake pad to slide in parallel with the rotary axis of the disc rotor, a predetermined clearance is provided between the first and second torque receiving parts of the torque member and the first and second torque transmission parts of the brake pad. Therefore, the first torque transmission part of the brake pad may abut against the first torque receiving part of the torque member at the time of braking during normal rotations of the disc rotor, thereby generating clunking sounds; while the second torque transmission part of the brake pad may abut against the second torque receiving part of the torque member at the time of braking during reverse rotations of the disc rotor, thereby generating clunking sounds.

Hence, disc brake apparatus for vehicles equipped with means for restraining such clunking sounds from occurring have been proposed in Patent Document 1 (Japanese Patent Application Laid-Open No. 2002-250376), Patent Document 2 (Japanese Patent Application Laid-Open No. 2001-336555), and the like. The disc brake apparatus described in Patent Document 1 is directed to one in which a first pad retainer (pad clip) made of a sheet metal is interposed between the first torque receiving part of the torque member and the first torque transmission part of the brake pad, while a similar second pad retainer is interposed between the second torque receiving part of the torque member and the second torque transmission part of the brake pad.

In the disc brake apparatus described in Patent Document 1, the second pad retainer to become the turning-in side of the disc rotor at the time of forward braking of the vehicle is provided with a first spring action part which always biases the second torque transmission part of the brake pad toward the turning-out side of the disc rotor (the first torque receiving part side of the torque member) at the time of forward braking, and a second spring action part which elastically receives the second torque transmission part of the brake pad at the time of back braking of the vehicle.

On the other hand, the disc brake apparatus for a vehicle described in Patent Document 2 is directed to one in which a pad shim having a vibration damping effect is additionally provided with a backing metal of the brake pad in order to restrain the brake pad from generating high-frequency vibrations at the time of braking, thereby suppressing the occurrence of so-called brake noise phenomenon.

In the disc brake apparatus described in Patent Document 2, the pad shim is integrally provided with a first anti-clunk part which is arranged between the first torque transmission part of the backing metal of the brake pad and the first torque receiving part of the torque member and generates a spring force, and a second anti-clunk part which is arranged between the second torque transmission part of the backing metal of the brake pad and the second torque receiving part of the torque member and generates a spring force.

DISCLOSURE OF THE INVENTION

Meanwhile, the disc brake apparatus described in Patent Document 1 cannot be expected to securely restrain clunking sounds from occurring at the time of back braking of the vehicle, since it only has a structure in which the second torque transmission part of the brake pad to become the turning-out side of the disc rotor at the time of back braking of the vehicle is simply elastically received by the second spring action part of the second pad retainer.

Similarly, the disc brake apparatus described in Patent Document 2 cannot be expected to securely restrain clunking sounds from occurring at the time of back braking of the vehicle, since it only has a structure in which the second torque transmission part of the brake pad to become the turning-out side of the disc rotor at the time of back braking of the vehicle is simply received by the spring force of the second anti-clunk part of the pad shim.

It is therefore an object of the present invention to provide a disc brake apparatus which can securely suppress clunking sounds not only at the time of normal braking of the disc rotor (forward braking of the vehicle) but also at the time of reverse braking of the disc rotor (back braking of the vehicle).

The disc brake apparatus in accordance with the present invention is a disc brake apparatus constructed such as to transmit a torque from a first torque transmission part of a brake pad to a first torque receiving part of a torque member at the time of normal braking of a disc rotor (forward braking of a vehicle) and transmit a torque from a second torque transmission part of the brake pad to a second torque receiving part of the torque member at the time of reverse braking of the disc rotor (back braking of the vehicle), the disc brake apparatus including switching holding means for holding the disc brake apparatus in a first contact state where the first torque transmission part of the brake pad abuts against the first torque receiving part of the torque member along with an operation for normal braking of the disc rotor (forward braking of the vehicle), and switching the disc brake apparatus to and holding a second contact state where the second torque transmission part of the brake pad abuts against the second torque receiving part of the torque member along with an operation for reverse braking of the disc rotor (back braking of the vehicle).

In the disc brake apparatus in accordance with the present invention, the switching holding means holds the disc brake apparatus in the first contact state in which the first torque transmission part of the brake pad abuts against the first torque receiving part of the torque member along with an operation for normal braking of the disc rotor (forward braking of the vehicle), and switches the disc brake apparatus to and holds the disc brake apparatus in the second contact state in which the second torque transmission part of the brake pad abuts against the second torque receiving part of the torque member along with an operation for reverse braking of the disc rotor (back braking of the vehicle). As a result, clunking sounds are securely suppressed not only at the time of normal braking of the disc rotor (forward braking of the vehicle) but also at the time of reverse braking of the disc rotor (back braking of the vehicle).

Here, the switching holding means in the disc brake apparatus in accordance with the present invention may be constituted by a spring piece provided with at least one of first and second pad retainers respectively attached to the first and second torque receiving parts of the torque member, and an engaging projection provided with the brake pad so as to correspond to the spring piece. In this case, the spring piece rides over the engaging projection by a sloping engagement, so as to selectively bias the engaging projection toward the first torque receiving part or second torque receiving part, thereby switching the disc brake apparatus to and holding the first or second contact state.

The switching holding means may be constituted by a spring piece provided with at least one of first and second pad retainers respectively attached to the first and second torque receiving parts of the torque member, and first and second engaging recesses provided with the brake pad so as to correspond to the spring piece. In this case, the switching holding means holds the braking apparatus in the first contact state by an engagement between the spring piece and first engaging recess, and switches it to and holds the second contact state by an engagement between the spring piece and second engaging recess.

The switching holding means may be constituted by a first spring piece provided with a first pad retainer attached to the first torque receiving part of the torque member, a second spring piece provided with a second pad retainer attached to the second torque receiving part of the torque member, and first and second engaging recesses provided with the brake pad so as to correspond to the first and second spring pieces. In this case, the switching holding means holds the disc brake apparatus in the first contact state by an engagement between the first spring piece and first engaging recess, and switches it to and holds the second contact state by an engagement between the second spring piece and second engaging recess.

Here, the switching holding means may be constructed such as to switch the disc apparatus to and hold the first or second contact state by a magnetic force. For example, it can be constituted by a first permanent magnet provided with the first torque receiving part of the torque member or the first torque transmission part of the brake pad and a second permanent magnet provided with the second torque receiving part of the torque member or the second torque transmission part of the brake pad. In this case, the switching holding means holds the disc brake apparatus in the first contact state by causing the first permanent magnet to attract the first torque transmission part of the brake pad or the first torque receiving part of the torque member, and switches the disc brake apparatus to and holds the second contact state by causing the second permanent magnet to attract the second torque transmission part of the brake pad or the second torque receiving part of the torque member.

The switching holding means can also be constituted by a first electromagnet provided with the first torque receiving part of the torque member and a second electromagnet provided with the second torque receiving part of the torque member. In this case, the switching holding means holds the disc brake apparatus in the first contact state by causing the first electromagnet to attract the first torque transmission part of the brake pad, and switches the disc brake apparatus to and holds the second contact state by causing the second electromagnet to attract the second torque transmission part of the brake pad.

Here, the switching holding means can be constituted by a closed hydraulic circuit connecting an orifice between a first piston provided with the first torque receiving part of the torque member and a second piston provided with the second torque receiving part of the torque member. In this case, the switching holding means holds the disc brake apparatus in the first contact state by contracting the first piston and expanding the second piston, and switches the disc brake apparatus to and holds the second contact state by contracting the second piston and expanding the first piston.

In the disc brake apparatus in accordance with the present invention, the switching holding means holds the disc brake apparatus in the first contact state where the first torque transmission part of the brake pad abuts against the first torque receiving part of the torque member along with an operation for normal braking of the disc rotor (forward braking of the vehicle), and switches the disc brake apparatus to and holds the second contact state where the second torque transmission part of the brake pad abuts against the second torque receiving part of the torque member along with an operation for reverse braking of the disc rotor (back braking of the vehicle), whereby clunking sounds can securely be suppressed not only at the time of normal braking of the disc rotor (forward braking of the vehicle) but also at the time of reverse braking of the disc rotor (back braking of the vehicle).

Here, the disk brake apparatus of the present invention in which the switching holding means is constructed such as to switch the disc brake apparatus to and hold the first or second contact state by a magnetic force makes it unnecessary to change forms of brake pads and pad retainers, and thus can easily be employed in conventional disc brake apparatus. Since it does not depend on elastic forces which may vary over years, the first or second contact state can be held by a stable holding force over a long period of time.

BEST MODES FOR CARRYING OUT THE INVENTION

In the following, embodiments of the disc brake apparatus in accordance with the present invention will be explained with reference to the drawings. Among the drawings for reference, FIG. 1 is a perspective view showing the exterior of the disc brake apparatus in accordance with the first embodiment of the present invention, FIG. 2 is a partial sectional view schematically showing a cross-sectional structure of a caliper in the disc brake apparatus shown in FIG. 1, and FIG. 3 is a side view schematically showing the disc brake apparatus shown in FIG. 1.

Figure 1:
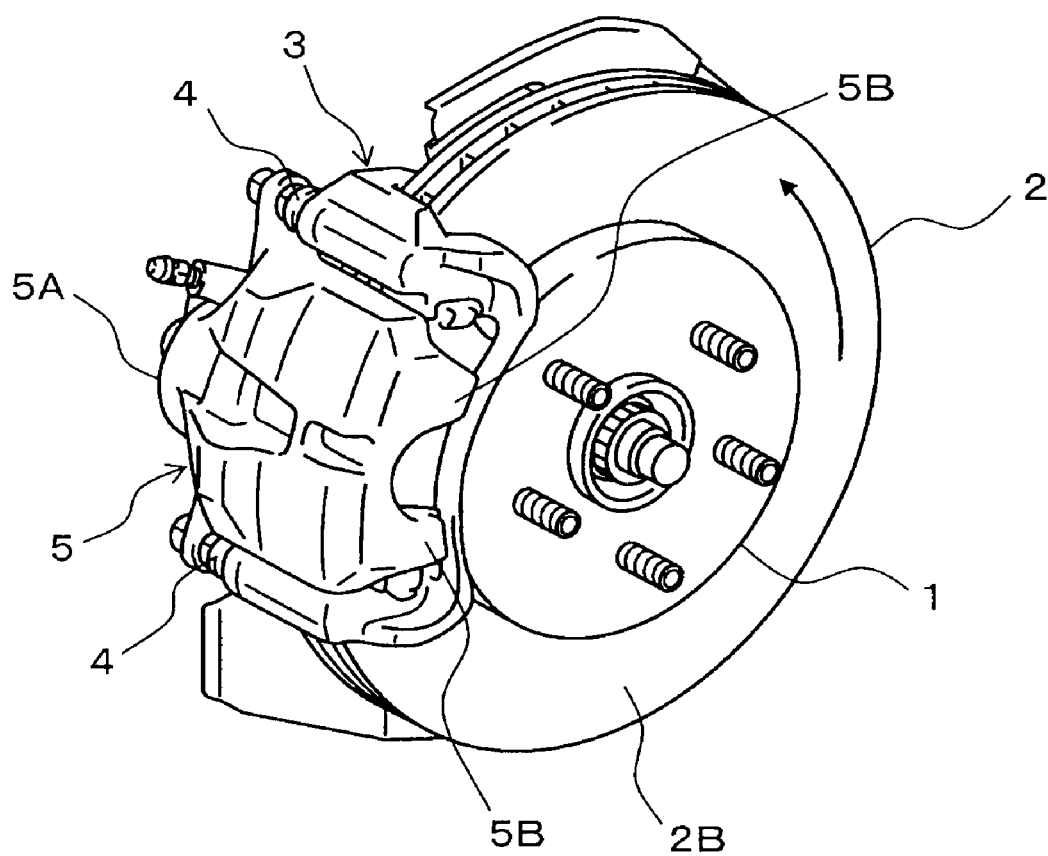
FIG. 1 is a perspective view showing the exterior of the disc brake apparatus in accordance with a first embodiment of the present invention.

The disc brake apparatus in accordance with the first embodiment, which is constructed for a vehicle, comprises a disc rotor 2 which is secured to a hub 1 of an axle so as to rotate integrally therewith, a torque member 3 which is supported by a suspension part or the like (not depicted) of a vehicle body and arranged such as to stride over an outer peripheral part of the disc rotor 2, and a floating caliper 5 which is attached to the torque member 3 with a pair of slide pins 4, 4 such as to be slidable in parallel with the rotary axis of the disc rotor 2, for example, as shown in FIG. 1.

Figure 2:
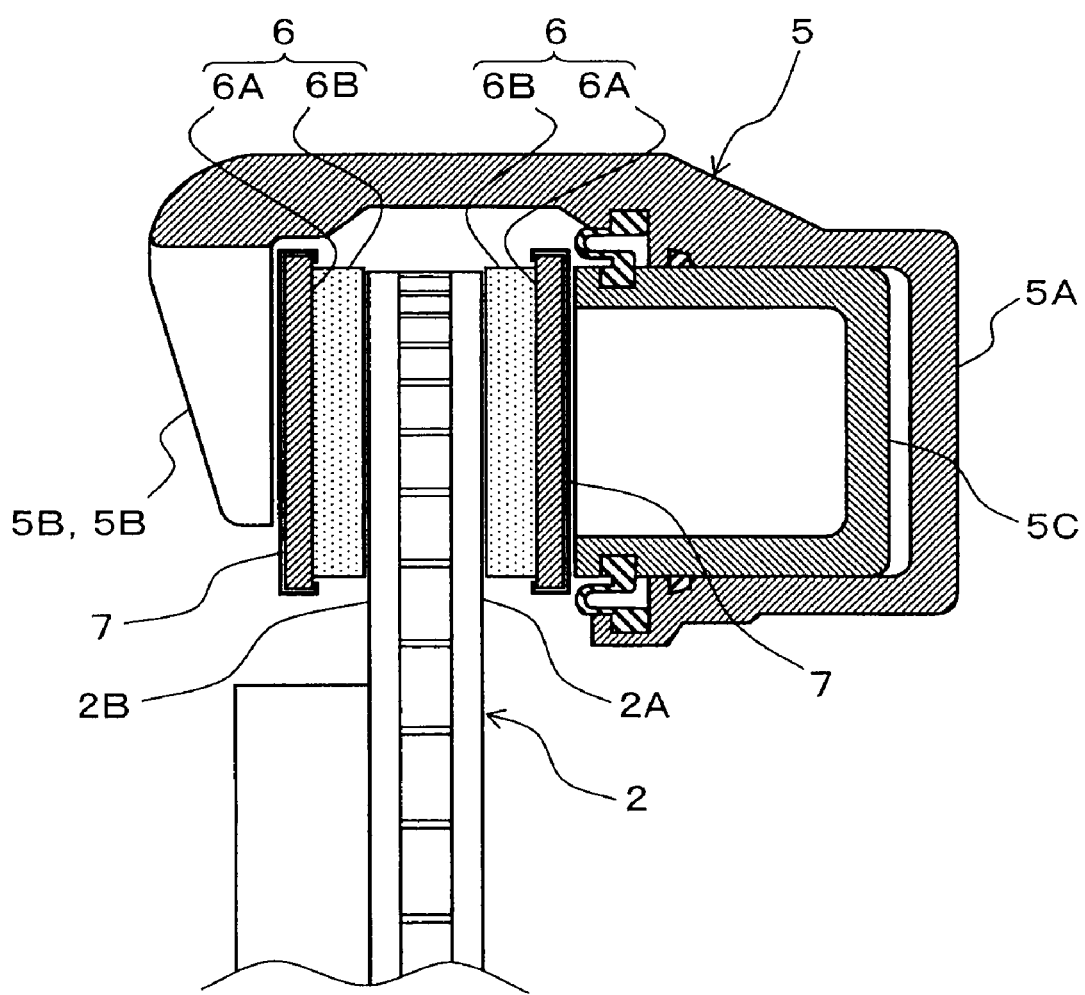
FIG. 2 is a partial sectional view schematically showing a cross-sectional structure of a caliper in the disc brake apparatus shown in FIG. 1.
Figure 3:
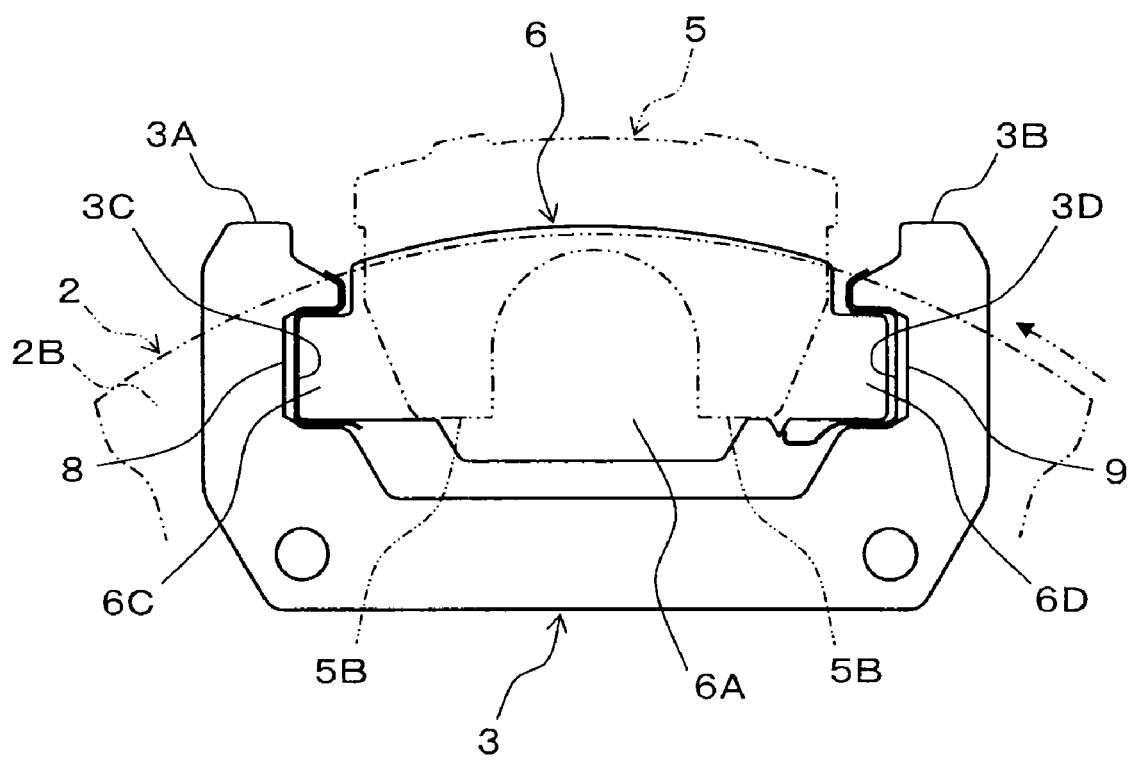
FIG. 3 is a side view of the disc brake apparatus shown in FIG. 1.

As shown in FIG. 2, the caliper 5 arranged such as to stride over the outer peripheral part of the disc rotor 2 has a cylinder part 5A facing an inner rotor surface 2A formed at the outer peripheral part of the disc rotor 2 and a pair of claws 5B, 5B (see FIG. 1) facing an outer rotor surface 2B, while a piston 5C is inserted in the cylinder part 5A. The piston 5C is constructed such as to advance and retract in parallel with the rotary axis of the disc rotor 2 in response to a brake hydraulic pressure supplied to the cylinder part 5A through a brake pipe of the vehicle which is not depicted.

A brake pad 6 is arranged between the claws 5B, 5B of the caliper 5 and the outer rotor surface 2B of the disc rotor 2, while a similar brake pad 6 is arranged between the piston 5C inserted in the cylinder part 5A of the caliper 5 and the inner rotor surface 2A of the disc rotor 2.

The brake pads 6, 6 have respective structures in which pad members 6B, 6B are joined to backing metals 6A, 6A. In one brake pad 6, the backing metal 6A opposes the claws 5B, 5B of the caliper 5, while the pad member 6B opposes the outer rotor surface 2B of the disc rotor 2. In the other brake pad 6, the backing metal 6A opposes the piston 5C inserted in the cylinder part 5A of the caliper 5, while the pad member 6B opposes the inner rotor surface 2A of the disc rotor 2.

In order to suppress high-frequency vibrations caused by the brake pads 6, 6 at the time of braking and prevent so-called brake noise from occurring, a pad shim 7 opposing the claws 5B, 5B is attached to the backing metal 6A of the first brake pad 6, while a pad shim 7 opposing the piston 5C is attached to the backing metal 6A of the second brake pad 6.

As shown in FIG. 3, a pair of torque transmission parts 6C, 6D, each shaped like a rectangular projection, are formed at both end parts of the backing metal 6A of the first brake pad 6 opposing the outer rotor surface 2B of the disc rotor 2. Correspondingly, a pair of arm parts 3A, 3B opposing the torque transmission parts 6C, 6D of the backing metal 6A are formed at outer portions of the torque member 3 opposing the outer rotor surface 2B of the disc rotor 2. The arm parts 3A, 3B are formed with a pair of torque receiving parts 3C, 3D which receive the torque transmission parts 6C, 6D of the backing metal 6A in a direction opposite from the rotating direction of the disc rotor 2, respectively.

The pair of torque receiving parts 3C, 3D are formed like rectangular grooves extending parallel to the rotary axis of the disc rotor 2. A first pad retainer 8 made of a spring steel sheet is mounted in one torque receiving part 3C, while a similar second pad retainer 9 is mounted in the other torque receiving part 3D. The first torque transmission part 6C fits into one torque receiving part 3C with the first pad retainer 8 interposed therebetween, while the second torque transmission part 6D fits into the other torque receiving part 3D with the second pad retainer 9 interposed therebetween, whereby the backing metal 6A of the brake pad 6 is slidable in parallel with the rotary axis of the disc rotor 2. Though not depicted, the backing metal 6A of the second brake pad 6 opposing the inner rotor surface 2A of the disc rotor 2 (see FIG. 2) and the inner portion of the torque member 3 corresponding to the backing metal 6A are constructed similarly.

Namely, the disc brake apparatus is constructed such that the rotary torque fed from the disc rotor 2 to the brake pad 6 is transmitted from the first torque transmission part 6C of the backing metal 6A to the first torque receiving part 3C of the torque member 3 at the time of forward braking of the vehicle in which the disc rotor 2 is normally rotated in the arrowed direction, and is transmitted from the second torque transmission part 6D of the backing metal 6A to the second torque receiving part 3D of the torque member 3 at the time of back braking of the vehicle in which the disc rotor 2 is reversely rotated in the direction opposite from the arrowed direction.

Figure 4:
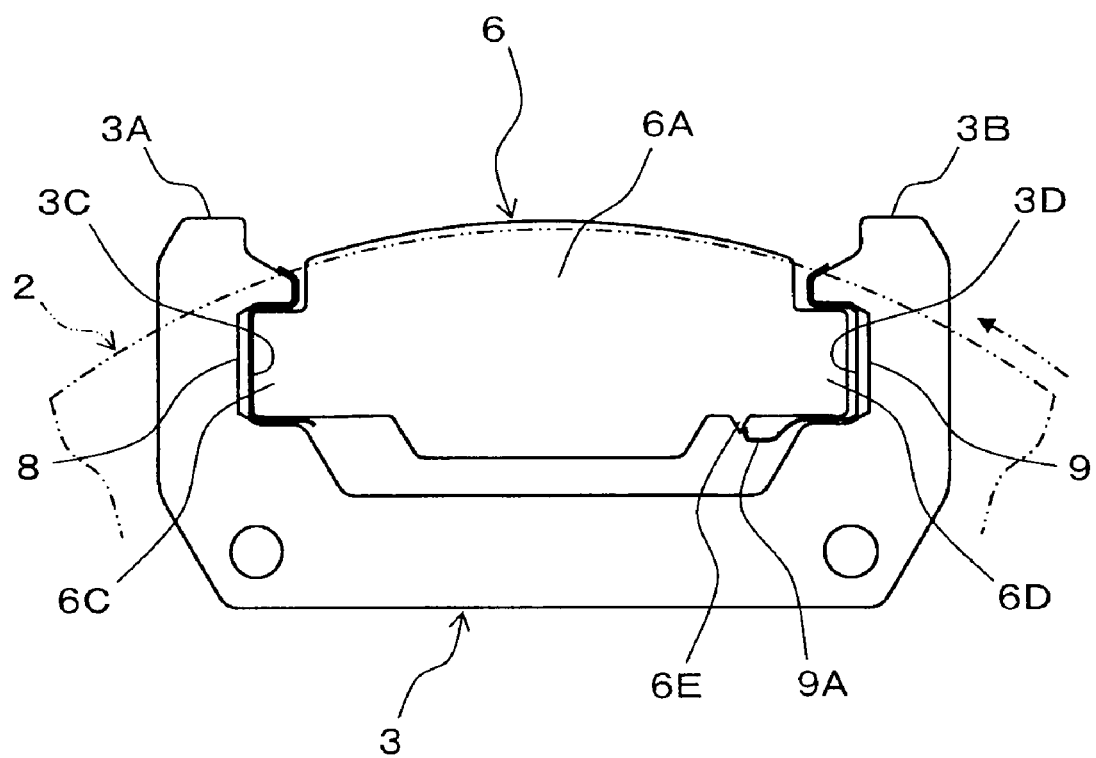
FIG. 4 is a side view showing a switching holding means in the disc brake apparatus in accordance with the first embodiment.

In the second torque transmission part 6D of the backing metal 6A of the brake pad 6, as shown in FIG. 4, an engaging projection 6E is formed on the surface facing the inner side in the radial direction of the disc rotor 2. Correspondingly, the second pad retainer 9 mounted in the other torque receiving part 3D of the torque member 3 is integrally formed with a spring piece 9A having a leading end part facing the engaging projection 6E. The engaging projection 6E and spring piece 9A cooperate with each other, so as to construct a switching holding means. As shown under magnification in FIG. 5, the engaging projection 6E is shaped like a chevron, while the spring piece 9A is constructed such that its leading end part is bent so as to be selectively engageable with slopes 6E1, 6E2 on both sides of the engaging projection 6E.

Figure 5:
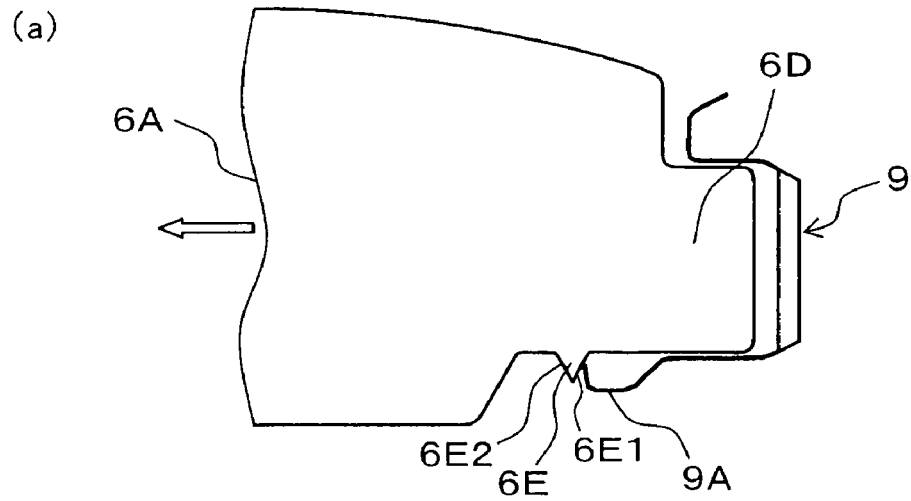
FIG. 5 is a partial enlarged view showing a behavior of the switching holding means shown in FIG. 4.
Figure 5:
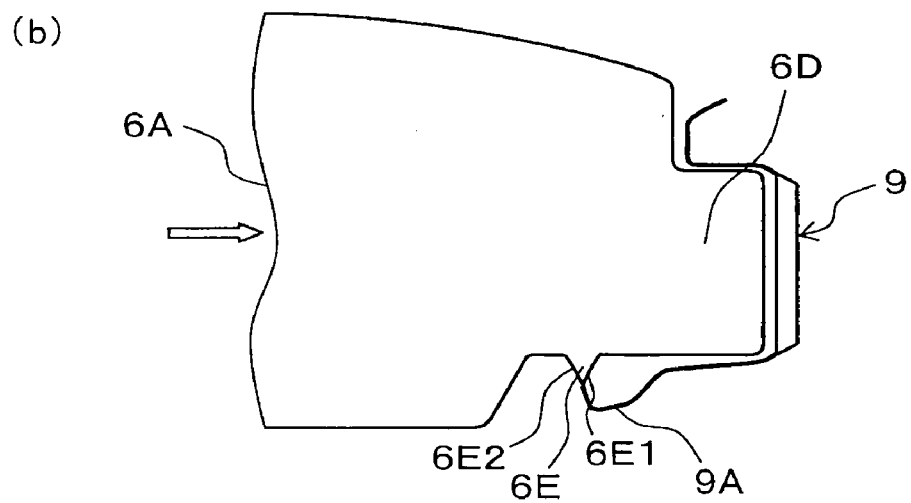
Figure 5:
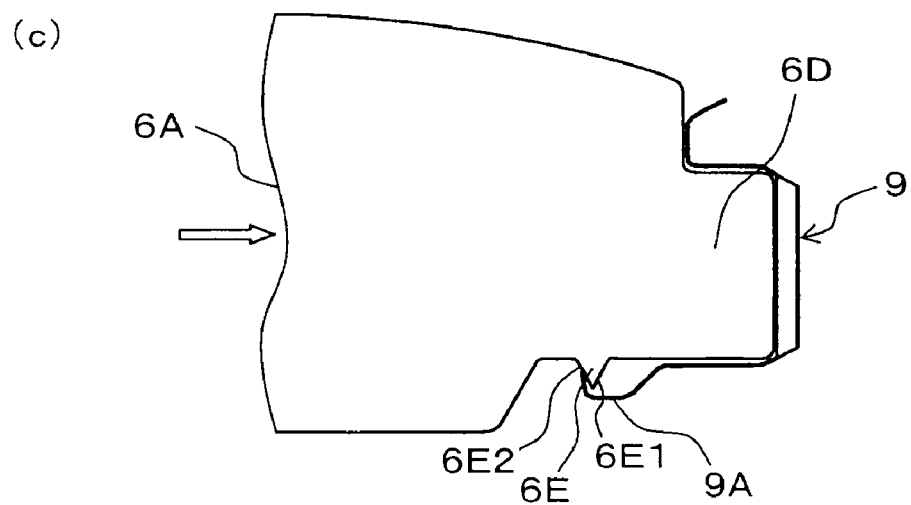

The leading end part of the spring piece 9A biases the backing metal 6A in the arrowed direction by engaging one slope 6E1 of the engaging projection 6E as shown in (a) of FIG. 5, and climbs over the top part of the engaging projection 6E when the engaging projection 6E moves in the arrowed direction together with the backing metal 6A as shown in (b) of FIG. 5. Then, the leading end part of the spring piece 9A engages the other slope 6E2 of the engaging projection 6E as shown in (c) of FIG. 5, thereby biasing the backing metal 6A in the arrowed direction opposite from that shown in (a) of FIG. 5.

When an undepicted brake pedal of the vehicle is operated for braking in thus constructed disc brake apparatus of the first embodiment, a brake hydraulic pressure corresponding to the stepping action of the brake pedal is supplied to the cylinder part 5A of the caliper 5 shown in FIG. 2, whereby the piston 5C advances. When the piston 5C pushes the backing metal 6A of the second brake pad 6, its reaction force causes the claws 5B, 5B of the caliper 5 to push the backing metal 6A of the first brake pad 6. As a result, the pad members 6B, 6B of the pair of brake pads 6, 6 come into frictional contact with the inner rotor surface 2A and outer rotor surface 2B of the disc rotor 2, thereby yielding a braking force.

At the time of forward braking of the vehicle in which the disc rotor 2 rotates normally in the arrowed direction as shown in FIG. 4, the rotary torque fed from the disc rotor 2 to the brake pad 6 causes the first torque transmission part 6C of the backing metal 6A to abut against the first torque member 3C by way of the first pad retainer 8, so that the rotary torque of the disc rotor 2 is transmitted to the first torque receiving part 3C of the torque member 3, whereby the vehicle attains a forward braking state.

At this time, the backing metal 6A of the brake pad 6 shifts toward the first torque receiving part 3C of the torque member 3 along the rotating direction of the disc rotor 2, so that the engaging projection 6E moves in the same direction, whereby the leading end part of the spring piece 9A engages one slope 6E1 of the engaging projection 6E as shown in (a) of FIG. 5 and elastically presses the backing metal 6A of the brake pad 6 toward the first torque receiving part 3C of the torque member 3. As a result, the disc brake apparatus is held in a first contact state where the first torque transmission part 6C of the backing metal 6A of the brake pad 6 abuts against the first torque receiving part 3C of the torque member 3 by way of the first pad retainer 8.

Therefore, the first torque transmission part 6C of the backing metal 6A of the brake pad 6 does not collide with the first torque receiving part 3C of the torque member 3 at the time of forward braking of the vehicle thereafter, whereby clunking sounds are securely suppressed at the time of forward braking of the vehicle.

Figure 6:
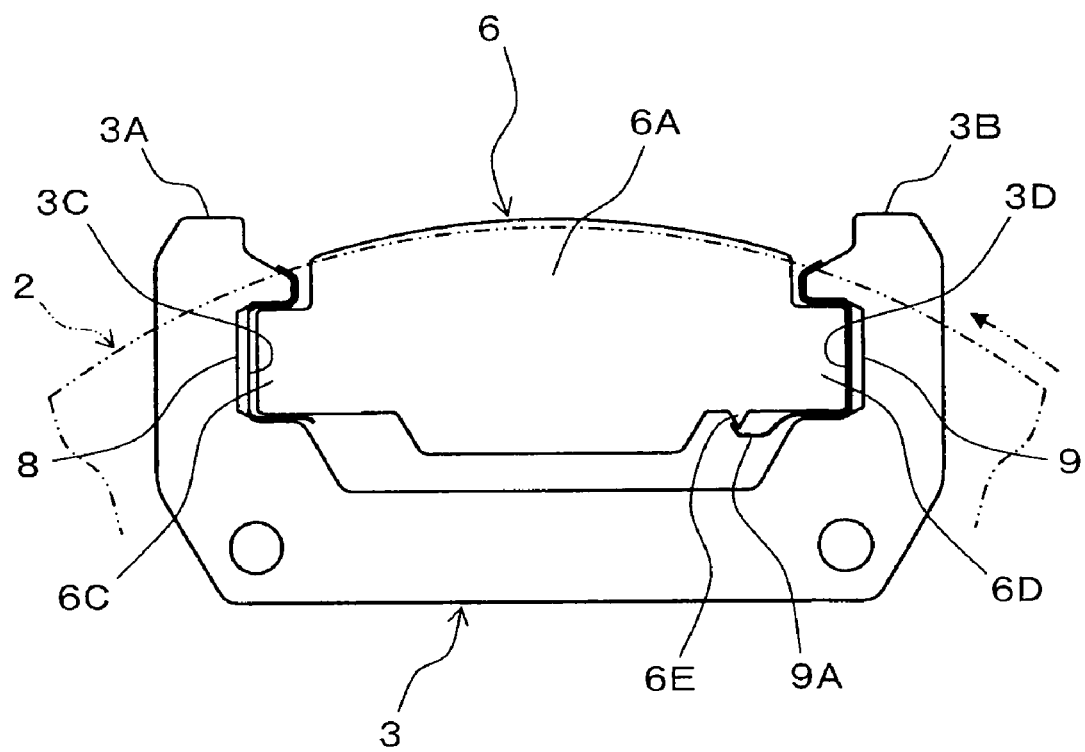
FIG. 6 is a side view showing the second contact state by the switching holding means in the disc brake apparatus in accordance with the first embodiment.

When the brake pedal is operated for braking in the state where the disc rotor 2 is reversely rotated in the arrowed direction as shown in FIG. 6 in the case where the vehicle is shifted from the forward state to the back state for putting it into a garage, turning, or the like, the rotary torque fed from the disc rotor 2 to the brake pad 6 causes the second torque transmission part 6D of the backing metal 6A to abut against the second torque receiving part 3D of the torque member 3 by way of the second pad retainer 9, so that the rotary torque of the disc rotor 2 is transmitted to the second torque receiving part 3D, whereby the vehicle attains a back braking state.

At this time, the backing metal 6A of the brake pad 6 shifts toward the second torque receiving part 3D of the torque member 3 along the rotating direction of the disc rotor 2, so that the engaging projection 6E moves in the same direction, whereby the leading end part of the spring piece 9A climbs over the top part of the engaging projection 6E as shown in (b) of FIG. 5 and then engages the other slope 6E2 of the engaging projection 6E as shown in (c) of FIG. 5, thus elastically biasing the backing metal 6A of the brake pad 6 toward the second torque receiving part 3D of the torque member 3. As a result, the disc brake apparatus is switched to and held in a second contact state where the second torque transmission part 6D of the backing metal 6A of the brake pad 6 abuts against the second torque receiving part 3D of the torque member 3 by way of the second pad retainer 9.

Therefore, the second torque transmission part 6D of the backing metal 6A of the brake pad 6 does not collide with the second torque receiving part 3D of the torque member 3 at the time of back braking of the vehicle thereafter, whereby clunking sounds are securely suppressed at the time of back braking of the vehicle.

Figure 7:
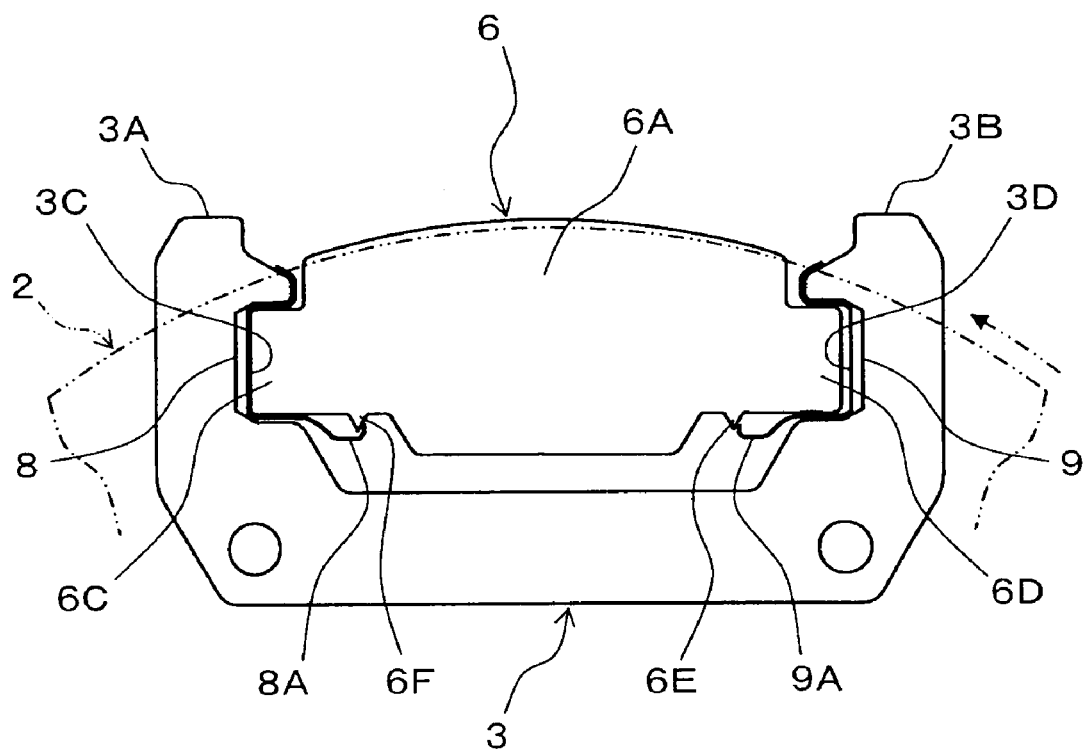
FIG. 7 is a side view showing a modified example of the switching holding means in the disc brake apparatus in accordance with the first embodiment.

The switching holding means in the disc brake apparatus in accordance with the first embodiment may be constructed on the second torque receiving part 6D side of the backing metal 6A of the brake pad 6, on the first torque receiving part 6C side thereof, or on both sides of the first and second torque receiving parts 6C, 6D (see FIG. 7).

For example, as shown in FIG. 7, the first torque transmission part 6C is additionally formed with an engaging projection 6F similar to the engaging projection 6E on the second torque transmission part 6D side. The first pad retainer 8 is formed with a spring piece 8A similar to the spring piece 9A of the second pad retainer 9. It will be preferred in this case if the leading end part of the spring piece 8A biases the engaging projection 6F in the same direction as that in which the leading end part of the spring piece 9A biases the engaging projection 6E, since the holding force for the above-mentioned first or second contact state is doubled thereby.

Figure 8:
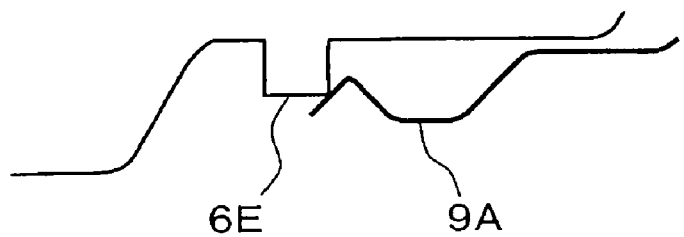
FIG. 8 is a partial enlarged view showing another modified example of the switching holding means in the disc brake apparatus in accordance with the first embodiment.
Figure 8:
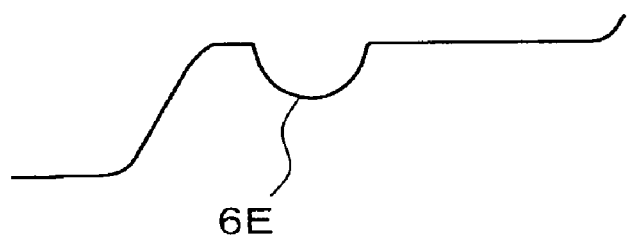
Figure 8:
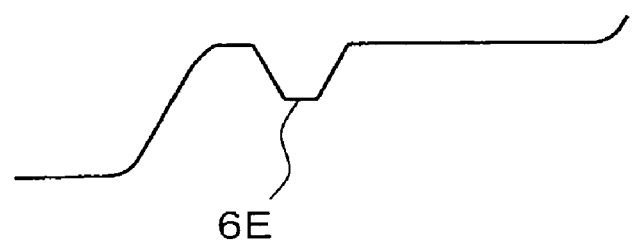
Figure 8:
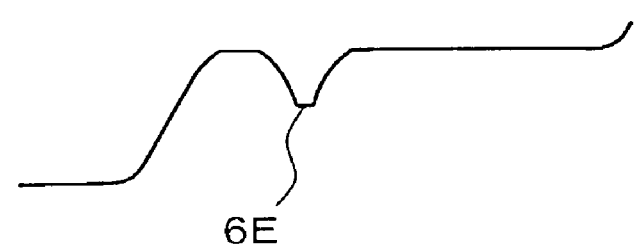

The engaging projection 6E can be changed into various forms without being restricted to the chevron form shown in FIG. 5, and the form of the spring piece 9A can be changed correspondingly as appropriate. For example, as shown in (a) of FIG. 8, the engaging projection 6E may have a quadrangular form, while the spring piece 9A may have a leading end part bent like a chevron so as to enable a sloping engagement with a corner part of the engaging projection 6E. The engaging projection 6E may also have a semicircular form as shown in (b) of FIG. 8, a trapezoidal form as shown in (c) of FIG. 8, or a chevron form with concave slopes as shown in (d) of FIG. 8. The forms of the engaging projection 6F and spring piece 8A can also be changed similarly.

The disc brake apparatus in accordance with the second embodiment will now be explained. Since this disc brake apparatus is substantially the same as that of the above-mentioned first embodiment except that the switching holding means in the first embodiment is changed, similar constituents will be referred to with the same numerals or letters while omitting their detailed explanations.

Figure 9:
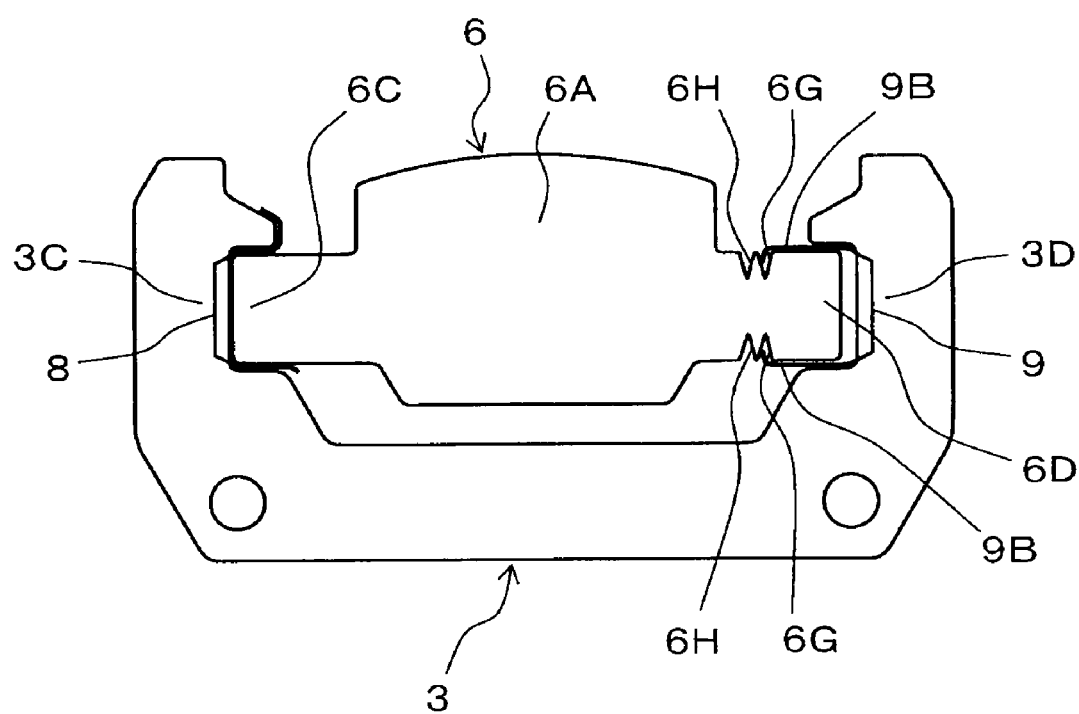
FIG. 9 is a side view showing the switching holding means in the disc brake apparatus in accordance with a second embodiment.

The switching holding means of the disc brake apparatus in accordance with the second embodiment is constructed as shown in FIG. 9, for example. Namely, in the second torque transmission part 6D of the backing metal 6A of the brake pad 6, a pair of first engaging recesses 6G, 6G and a pair of second engaging recesses 6H, 6H are formed adjacent to each other on both surfaces facing the inner and outer sides of the disc rotor 2 in the radial direction. Correspondingly, the second pad retainer 9 attached to the second torque receiving part 3D of the torque member 3 is integrally formed with a pair of spring pieces 9B, 9B.

The pair of first engaging recesses 6G, 6G and the pair of second engaging recesses 6H, 6H are formed like V-grooves, while the pair of spring pieces 9B, 9B have leading end parts bent such as to be selectively engageable with the first engaging recesses 6G, 6G or second engaging recesses 6H, 6H. Namely, when the brake pad 6 shifts toward the first torque receiving part 3C of the torque member 3 as shown in FIG. 9 so that the first torque transmission part 6C of the backing metal 6A abuts against the first torque receiving part 3C by way of the first pad retainer 8, the leading end parts of the pair of spring pieces 9B, 9B engage the pair of first engaging recesses 6G, 6G. When the brake pad 6 shifts toward the second torque receiving part 3D of the torque member 3 as shown in FIG. 10 so that the second torque transmission part 6D of the backing metal 6A abuts against the second torque receiving part 3D by way of the second pad retainer 9, by contrast, the leading end parts of the pair of spring pieces 9B, 9B engage the pair of second engaging recesses 6H, 6H.

Therefore, when the first torque transmission part 6C of the backing metal 6A of the brake pad 6 abuts against the first torque receiving part 3C of the torque member 3 by way of the first pad retainer 8 upon forward braking of the vehicle, the leading end parts of the pair of spring pieces 9B, 9B engage the pair of engaging recesses 6G, 6G, whereby the disc brake apparatus of the second embodiment is held in the above-mentioned first contact state (see FIG. 9). As a result, the first torque transmission part 6C of the backing metal 6A of the brake pad 6 does not collide with the first torque receiving part 3C of the torque member 3 at the time of forward braking of the vehicle thereafter, whereby clunking sounds are securely suppressed at the time of forward braking of the vehicle.

Figure 10:
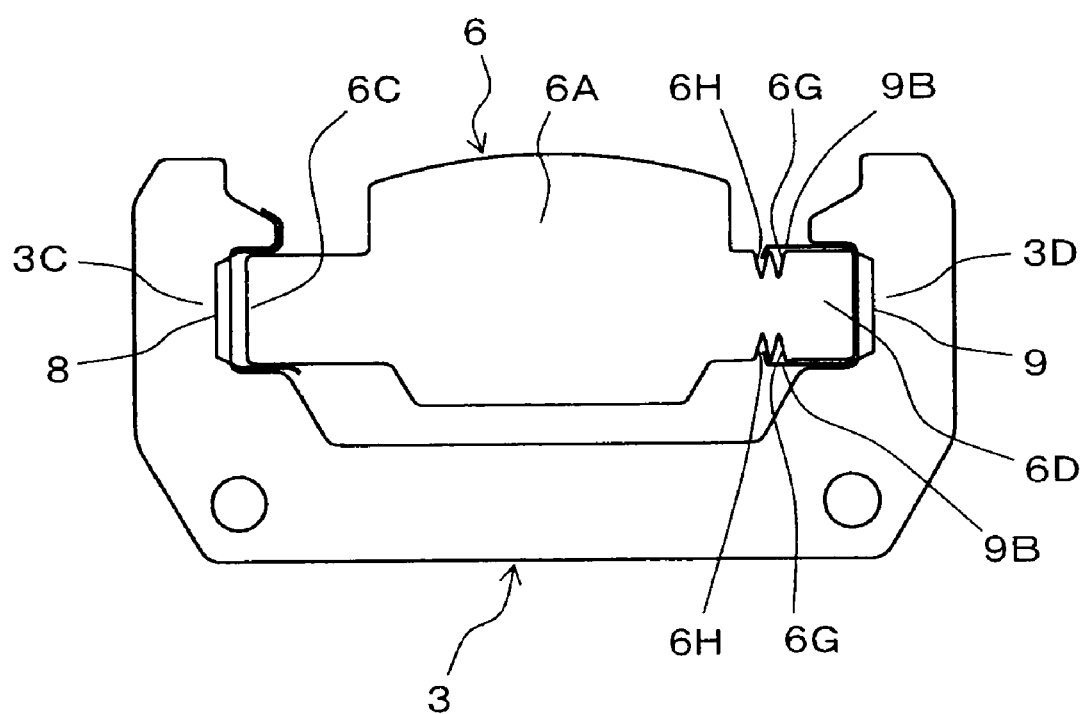
FIG. 10 is a side view showing the second contact state by the switching holding means in the disc brake apparatus in accordance with the second embodiment.

When the second torque transmission part 6D of the backing metal 6A of the brake pad 6 abuts against the second torque receiving part 3D of the torque member 3 by way of the second pad retainer 9 upon back braking of the vehicle, by contrast, the leading end parts of the pair of spring pieces 9B, 9B engage the pair of second engaging recesses 6H, 6H, whereby the disc brake apparatus is held in the above-mentioned second contact state (see FIG. 10). As a result, the second torque transmission part 6D of the backing metal 6A of the brake pad 6 does not collide with the second torque receiving part 3D of the torque member 3 at the time of back braking of the vehicle thereafter, whereby clunking sounds are securely suppressed at the time of back braking of the vehicle.

The switching holding means in the disc brake apparatus of the second embodiment may be constructed not only on the second torque transmission part 6D side of the backing metal 6A of the brake pad 6, but also on the first torque transmission part 6C side. The switching holding means may be constructed on both sides of the first and second torque receiving parts 6C, 6D or separately from each other on the first torque receiving part 6C and the second torque receiving part 6D (see FIG. 11).

Figure 11:
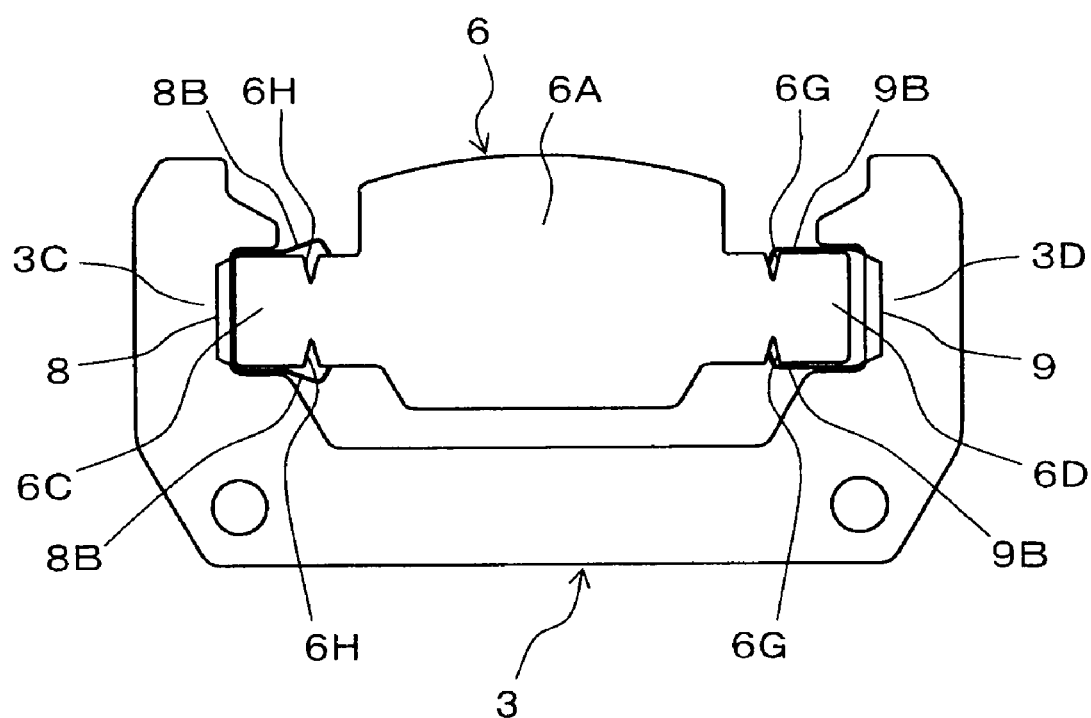
FIG. 11 is a side view showing a modified example of the switching holding means in the disc brake apparatus in accordance with the second embodiment.

For example, as shown in FIG. 11, the pair of second engaging recesses 6H, 6H constituting the switching and holding means are formed in the first torque transmission part 6C of the backing metal 6A of the brake pad 6 instead of the second torque transmission part 6D. The first pad retainer 8 is formed with spring pieces 8B, 8B similar to the pair of spring pieces 9B, 9B of the second pad retainer 9. The pair of spring pieces 9B, 9B of the second pad retainer 9 are used as first spring pieces which engage only the pair of first engaging recesses 6G, 6G, while the pair of spring pieces 8B, 8B of the first pad retainer 8 are used as second spring pieces which engage only the pair of second engaging recesses 6H, 6H.

In this case, the pair of second engaging recesses 6H, 6H and the leading end parts of the pair of second spring pieces 8B, 8B are arranged such as to engage each other at positions where the second torque transmitting part 6D of the backing metal 6A of the brake pad 6 abuts against the second torque receiving part 3D of the torque member 3 by way of the second pad retainer 9.

The forms of the pair of first engaging recesses 6G, 6G and pair of second engaging recesses 6H, 6H can be changed to appropriate cross-sectional forms such as those of U-grooves without being restricted to V-grooves.

The disc brake apparatus in accordance with the third embodiment will now be explained. Since this disc brake apparatus is substantially the same as that of the above-mentioned first embodiment except that the switching holding means in the first embodiment is changed so as to be constituted by permanent magnets, similar constituents will be referred to with the same numerals or letters while omitting their detailed explanations.

Figure 12:
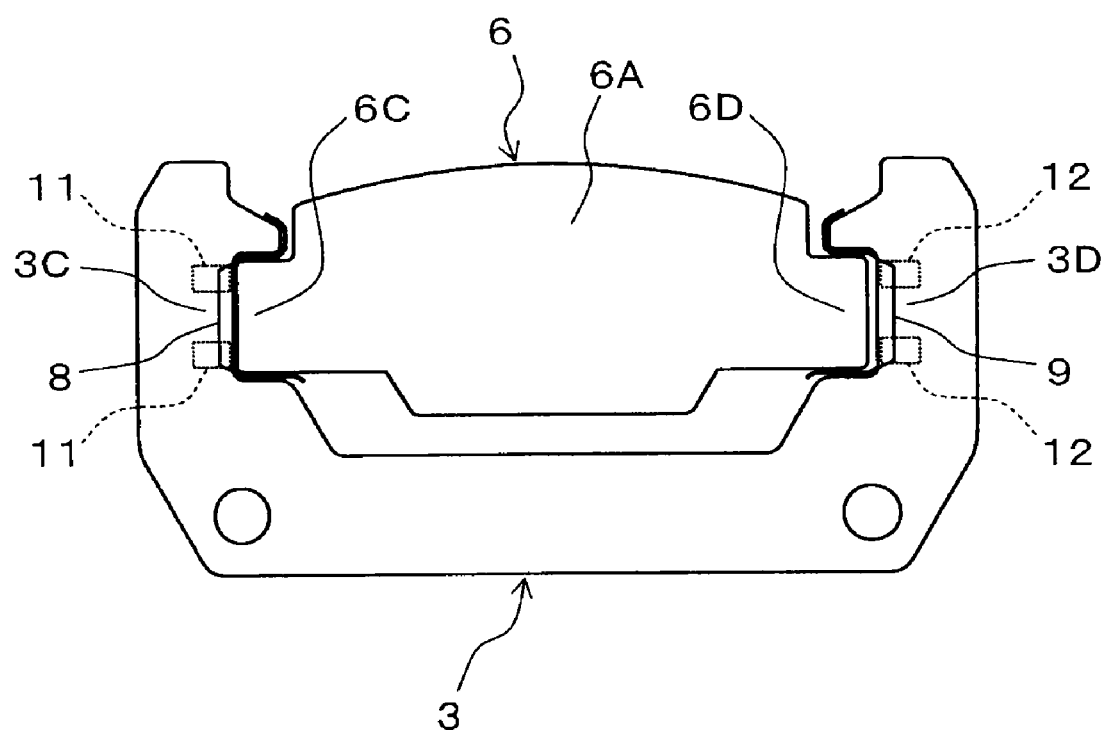
FIG. 12 is a side view showing the switching holding means in the disc brake apparatus in accordance with a third embodiment.

The switching holding means of the disc brake apparatus in accordance with the third embodiment is constructed as shown in FIG. 12, for example. Namely, a pair of first permanent magnets 11, 11 for attracting the first torque transmission part 6C of the backing metal 6A of the brake pad 6 are buried in the first torque receiving part 3C of the torque member 3, while a pair of second permanent magnets 12, 12 for attracting the second torque transmission part 6D of the backing metal 6A of the brake pad 6 are buried in the second torque receiving part 3D of the torque member 3.

The pair of first permanent magnets 11, 11 are arranged separately from each other in the radial direction of the disc rotor 2 such as to attract the first torque transmission part 6C of the backing metal 6A evenly. Similarly, the pair of second permanent magnets 12, 12 are arranged separately from each other in the radial direction of the disc rotor 2 such as to attract the second torque transmission part 6D of the backing metal 6A evenly.

Therefore, when the first torque transmission part 6C of the backing metal 6A of the brake pad 6 abuts against the first torque receiving part 3C of the torque member 3 by way of the first pad retainer 8 upon forward braking of the vehicle, the pair of first permanent magnets 11, 11 attract the first torque transmission part 6C of the backing metal 6A evenly, whereby the disc brake apparatus of the third embodiment is held in the above-mentioned first contact state (see FIG. 12). As a result, the first torque transmission part 6C of the backing metal 6A of the brake pad 6 does not collide with the first torque receiving part 3C of the torque member 3 at the time of forward braking of the vehicle thereafter, whereby clunking sounds are securely suppressed at the time of forward braking of the vehicle.

Figure 13:
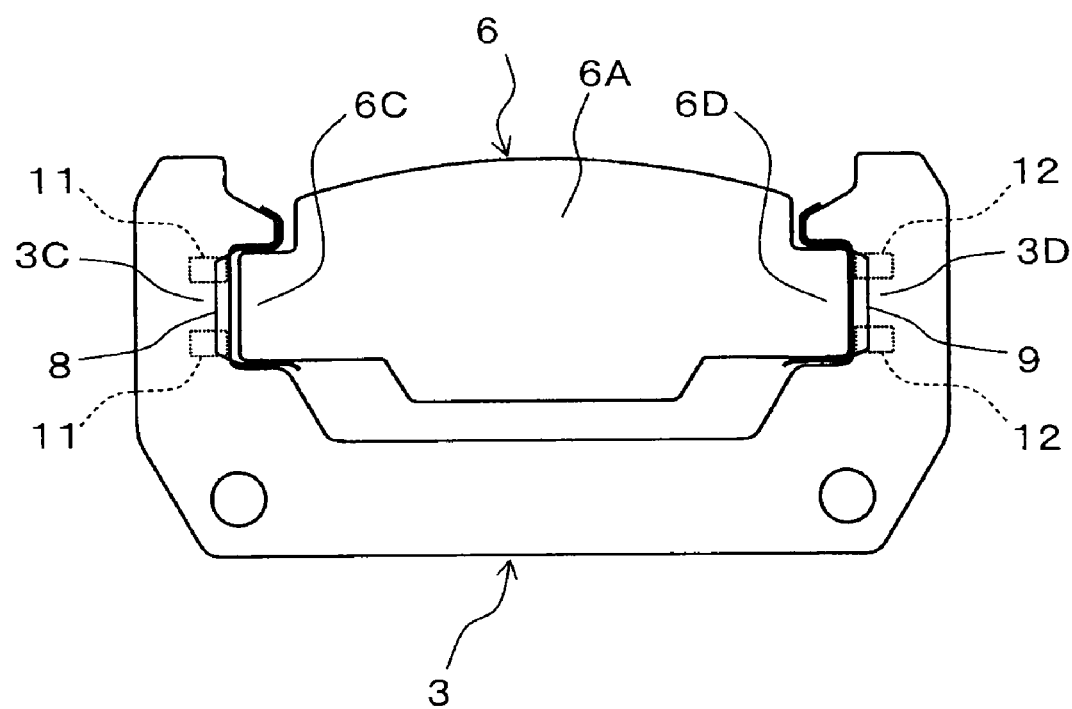
FIG. 13 is a side view showing the second contact state by the switching holding means in the disc brake apparatus in accordance with the third embodiment.

When the second torque transmission part 6D of the backing metal 6A of the brake pad 6 abuts against the second torque receiving part 3D of the torque member 3 by way of the second pad retainer 9 upon back braking of the vehicle, the pair of second permanent magnets 12, 12 attract the second torque transmission part 6D of the backing metal 6A evenly, whereby the disc brake apparatus is held in the above-mentioned second contact state (see FIG. 13). As a result, the second torque transmission part 6D of the backing metal 6A of the brake pad 6 does not collide with the second torque receiving part 3D of the torque member 3 at the time of back braking of the vehicle thereafter, whereby clunking sounds are securely suppressed at the time of back braking of the vehicle.

Figure 14:
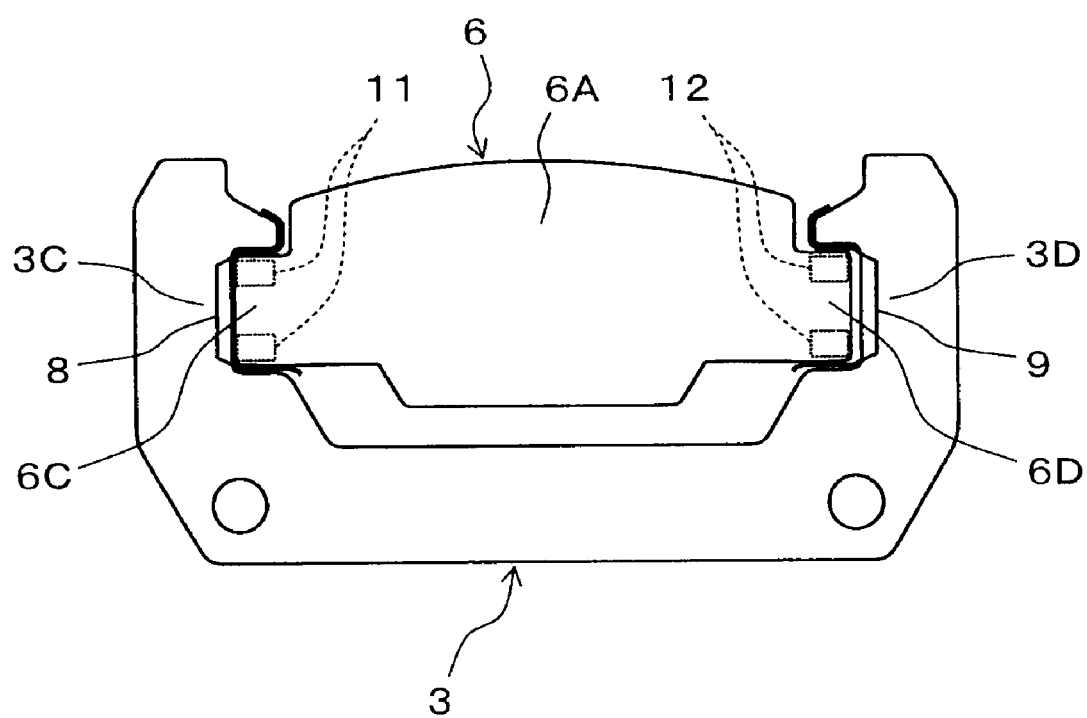
FIG. 14 is a side view showing a first modified example of the switching holding means in the disc brake apparatus in accordance with the third embodiment.

Places where the pair of first permanent magnets 11, 11 and pair of second permanent magnets 12, 12 in the disc brake apparatus of the third embodiment are placed and their numbers can be changed as appropriate. For example, as shown in FIG. 14, the pair of first permanent magnets 11, 11 may be buried in the first torque transmission part 6C of the backing metal 6A of the brake pad 6, while the pair of second permanent magnets 12, 12 may be buried in the second torque transmission part 6D of the backing metal 6A of the brake pad 6.

Figure 15:
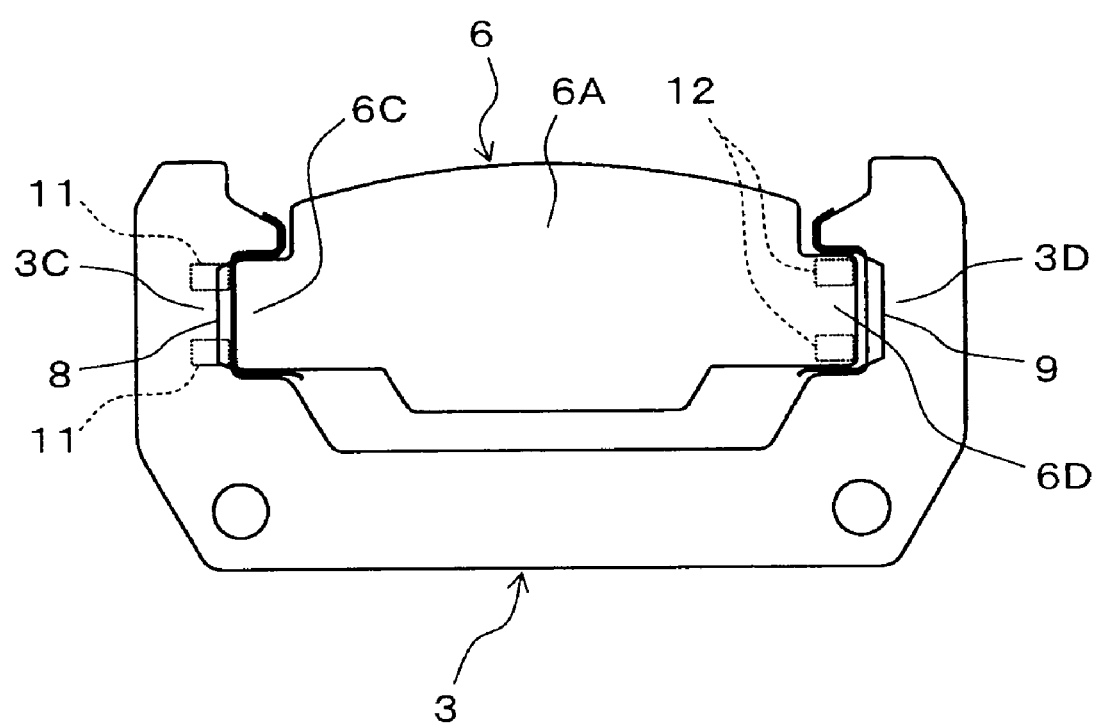
FIG. 15 is a side view showing a second modified example of the switching holding means in the disc brake apparatus in accordance with the third embodiment.

As shown in FIG. 15, the pair of first permanent magnets 11, 11 may be buried in the first torque receiving part 3C of the torque member 3, while the pair of second permanent magnets 12, 12 may be buried in the second torque transmission part 6D of the backing metal 6A of the brake pad 6.

Figure 16:
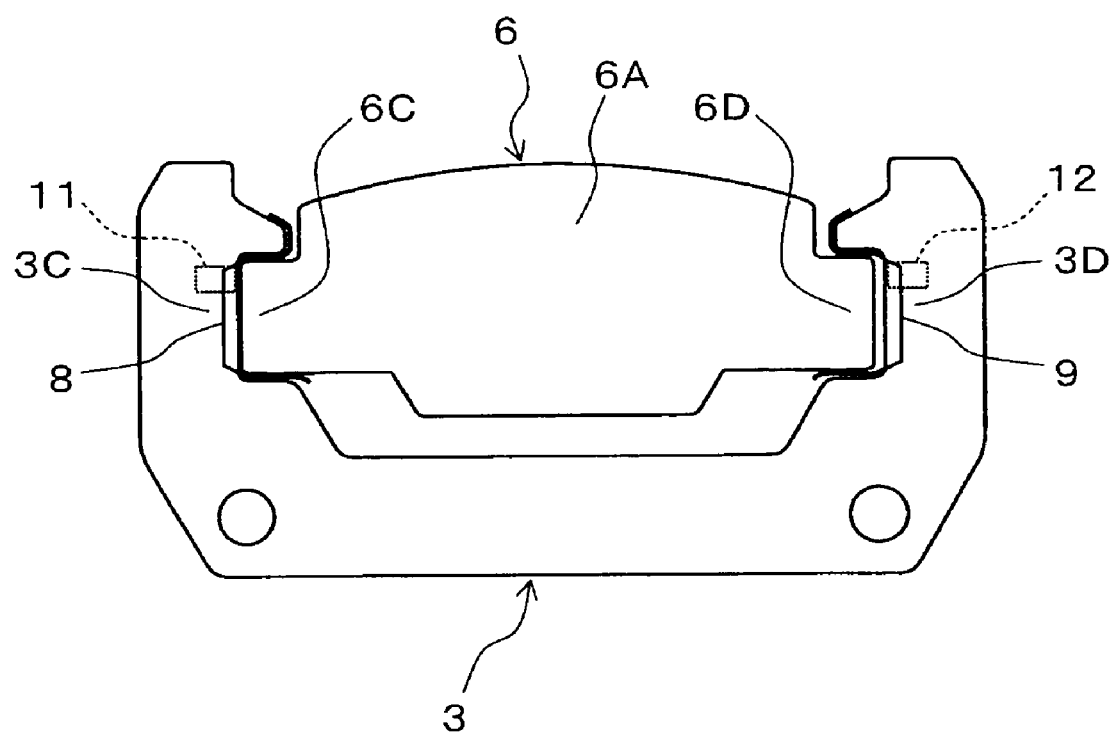
FIG. 16 is a side view showing a third modified example of the switching holding means in the disc brake apparatus in accordance with the third embodiment.
Figure 17:
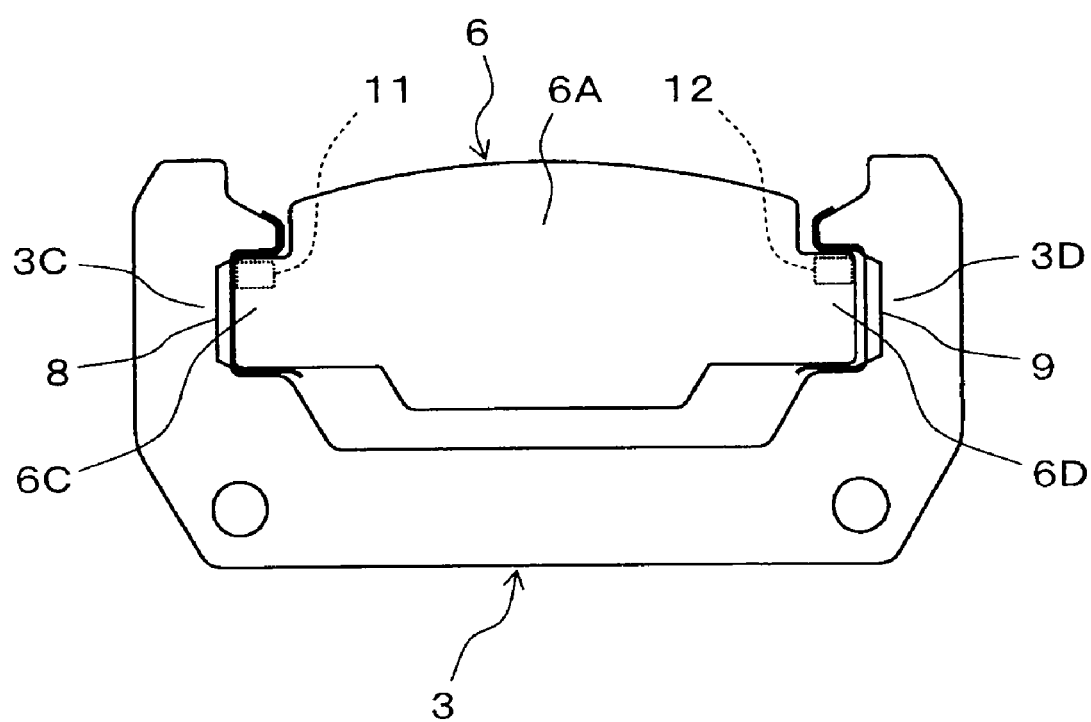
FIG. 17 is a side view showing a fourth modified example of the switching holding means in the disc brake apparatus in accordance with the third embodiment.

Among the pair of first permanent magnets 11, 11 and pair of second permanent magnets 12, 12 shown in FIG. 12, one first permanent magnet 11 and one second permanent magnet 12 which are arranged on the inner side of the disc rotor 2 in the radial direction may be omitted as shown in FIG. 16. Similarly, among the pair of first permanent magnets 11, 11 and pair of second permanent magnets 12, 12 shown in FIG. 14, one first permanent magnet 11 and one second permanent magnet 12 which are arranged on the inner side of the disc rotor 2 in the radial direction may be omitted as shown in FIG. 17.

Figure 18:
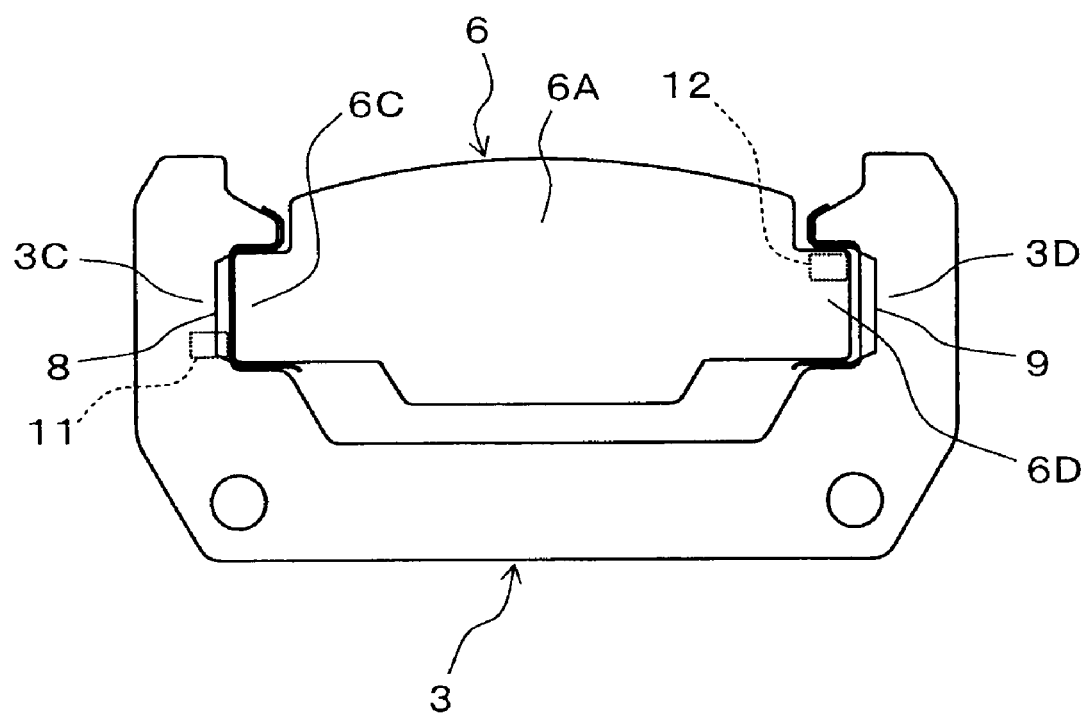
FIG. 18 is a side view showing a fifth modified example of the switching holding means in the disc brake apparatus in accordance with the third embodiment.

Among the pair of first permanent magnets 11, 11 and pair of second permanent magnets 12, 12 shown in FIG. 13, the first permanent magnet 11 arranged on the outer side of the disc rotor 2 in the radial direction and the second permanent magnet 12 arranged on the inner side of the disc rotor 2 in the radial direction, for example, may be omitted as shown in FIG. 18.

The disc brake apparatus in accordance with the fourth embodiment will now be explained. Since this disc brake apparatus is substantially the same as that of the above-mentioned first embodiment except that the switching holding means in the first embodiment is changed so as to be constituted by electromagnets, similar constituents will be referred to with the same numerals or letters while omitting their detailed explanations.

Figure 19:
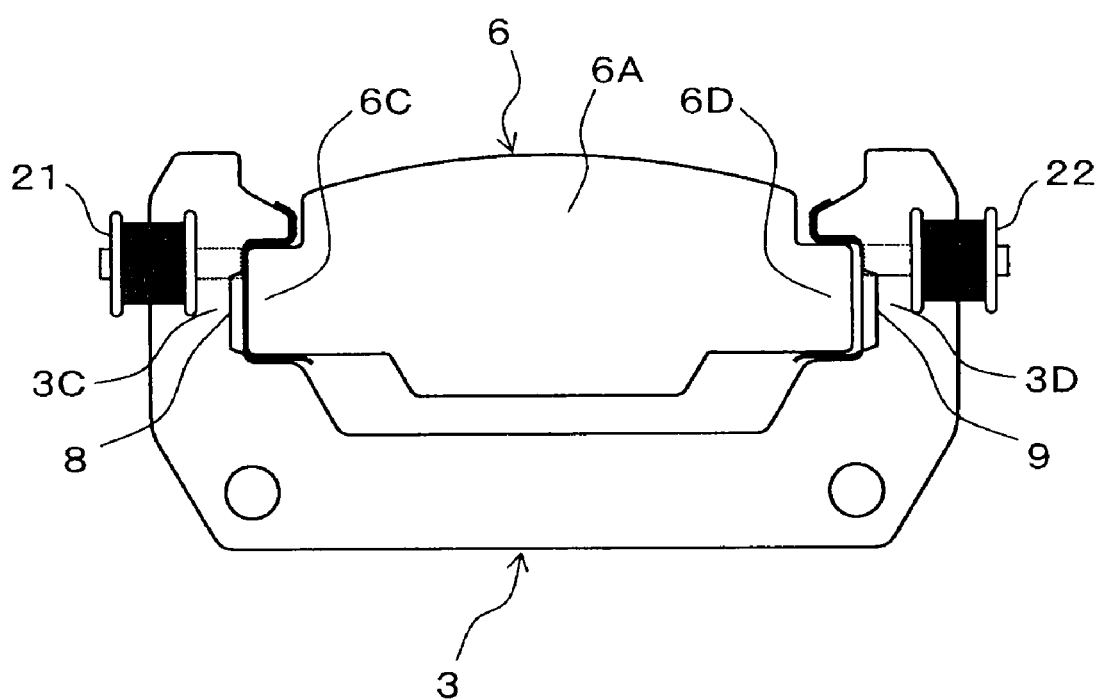
FIG. 19 is a side view showing the switching holding means in the disc brake apparatus in accordance with a fourth embodiment.

The switching holding means of the disc brake apparatus in accordance with the fourth embodiment is constructed as shown in FIG. 19, for example. Namely, a first electromagnet 21 for attracting the first torque transmission part 6C of the backing metal 6A of the brake pad 6 is buried in the first torque receiving part 3C of the torque member 3, while a second electromagnet 22 for attracting the second torque transmission part 6D of the backing metal 6A of the brake pad 6 is buried in the second torque receiving part 3D of the torque member 3.

The first electromagnet 21 is arranged such as to attract the outer portion of the first torque transmission part 6C of the backing metal 6A in the radial direction of the disc rotor 2, while the second electromagnet 22 is arranged such as to attract the outer portion of the second torque transmission part 6D of the backing metal 6A in the radial direction of the disc rotor 2.

Figure 20:
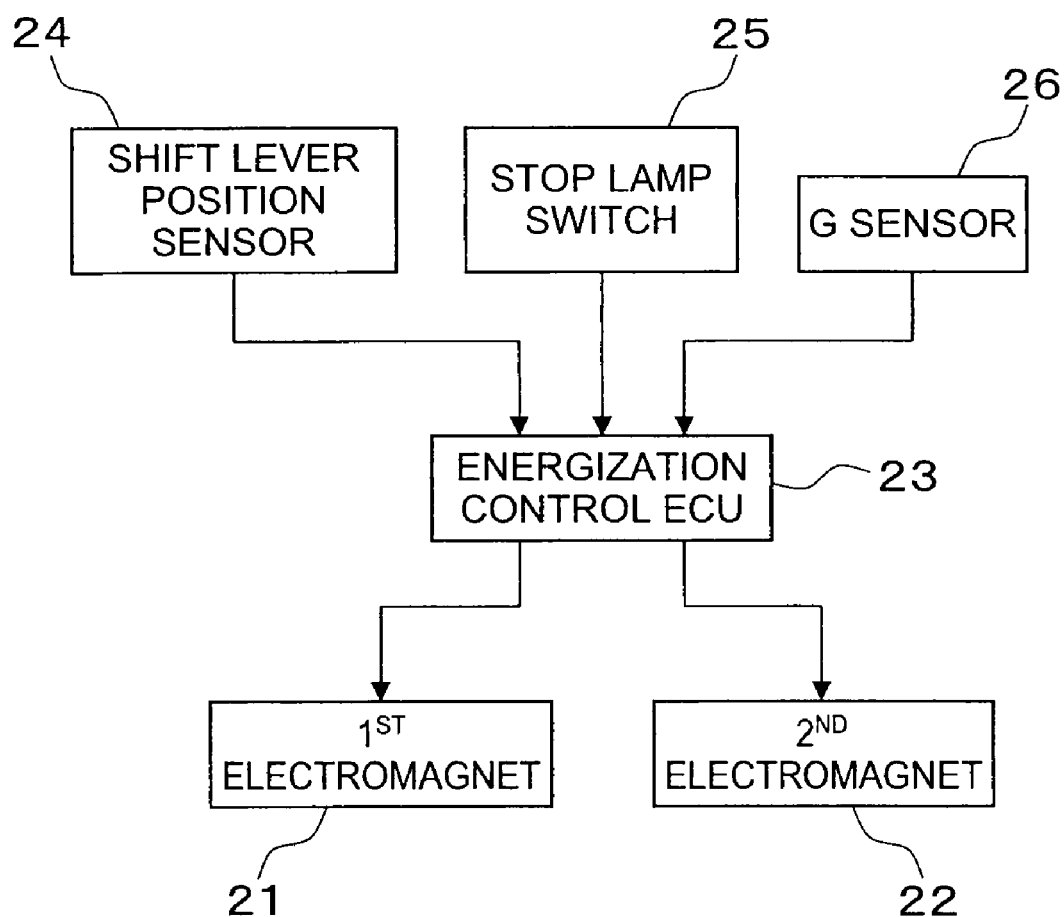
FIG. 20 is a block diagram showing the structure of an energization control system for the first and second electromagnets shown in FIG. 19.

Here, the energization of the first and second electromagnets 21, 22 is controlled by an ECU (Electric Control Unit) 23 for energization control shown in FIG. 20, for example. The energization control ECU 23 is a microcomputer comprising an input/output interface I/O, an A/D converter, a ROM (Read Only Memory) storing programs and data, a RAM (Random Access Memory) for temporarily inputting data and the like, a CPU (Central Processing Unit) for executing the programs, and the like as hardware.

From a shift lever position sensor 24 which can detect forward and backward movements of the vehicle discriminately from each other, a stop lamp switch 25 which can detect starting of a braking operation of the vehicle, a G sensor 26 which can detect the occurrence of a braking force in the vehicle, and the like, respective detection signals are fed into the energization control ECU 23.

Figure 21:
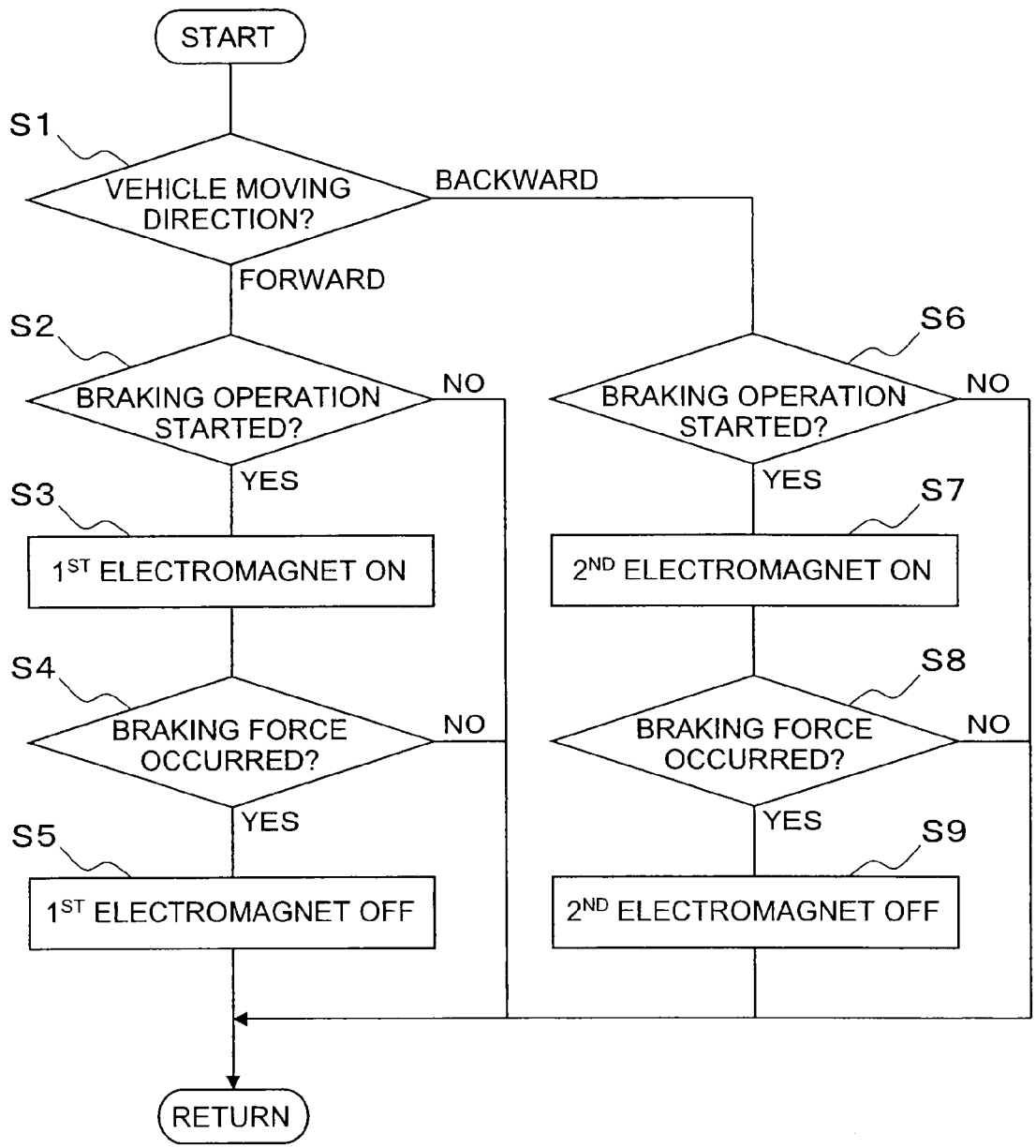
FIG. 21 is a flowchart showing a procedure of processing executed by the energization control ECU shown in FIG. 20.

In the disc brake apparatus of the fourth embodiment, the energization control ECU 23 controls the energization of the first and second electromagnets 21, 22 according to the processing procedure shown in the flowchart of FIG. 21. First, at step S1, it is determined according to the detection signal of the shift lever position sensor 24 whether the vehicle moves in the forward or backward direction.

When it is determined that the moving direction of the vehicle is forward at step S1, it is determined at the subsequent step S2 according to the ON/OFF signal of the stop lamp switch 25 whether a braking operation by the brake pedal of the vehicle (not depicted) is started or not.

When the result of determination at step S2 is YES, so that it is determined that the braking operation of the vehicle is started, the first electromagnet 21 is turned on by energization at the subsequent step S3. As a result, the first torque transmission part 6C of the backing metal 6A of the brake pad 6 is attracted to the first electromagnet 21 so as to abut against the first torque receiving part 3C of the torque member 3, whereby the disc brake apparatus is held in the above-mentioned first contact state.

Therefore, in the disc brake apparatus of the fourth embodiment, the first torque transmission part 6C of the backing metal 6A of the brake pad 6 does not collide with the first torque receiving part 3C of the torque member 3 at the time of forward braking of the vehicle, whereby clunking sounds are securely suppressed at the time of forward braking of the vehicle.

At the subsequent step S4, it is determined according to the detection signal of the G sensor 26 whether a braking force is generated in the vehicle or not. When the result of determination is YES, the vehicle is assumed to be in the process of forward braking, so that the first electromagnet 21 is turned off by de-energization, and the flow returns to step S1.

When it is determined at step S1 that the moving direction of the vehicle is backward, it is determined at the subsequent step S6 according to the ON/OFF signal of the stop lamp switch 25 whether a braking operation by the brake pedal of the vehicle (not depicted) is started or not.

When the result of determination at step S6 is YES, so that it is determined that the braking operation is started, the second electromagnet 22 is turned on by energization at the subsequent step S7. As a result, the second torque transmission part 6D of the backing metal 6A of the brake pad 6 is attracted to the second electromagnet 22 so as to abut against the second torque receiving part 3D of the torque member 3, whereby the disc brake apparatus is held in the above-mentioned second contact state.

Therefore, in the disc brake apparatus of the fourth embodiment, the second torque transmission part 6D of the backing metal 6A of the brake pad 6 does not collide with the second torque receiving part 3D of the torque member 3 at the time of back braking of the vehicle, whereby clunking sounds are securely suppressed at the time of forward braking of the vehicle.

At the subsequent step S8, it is determined according to the detection signal of the G sensor 26 whether a braking force is generated in the vehicle or not. When the result of determination is YES, the vehicle is assumed to be in the process of back braking, so that the second electromagnet 22 is turned off by de-energization, and the flow returns to step S1.

When the result of determination at any of the above-mentioned steps S2, S4, S6, and S8 is NO, the flow returns to step S1, so as to repeat a series of processing operations. The processing of step S5 may be executed at a stage before step S6, while the processing of step S9 may be executed at a stage before step S2.

The disc brake apparatus in accordance with the fifth embodiment will now be explained. Since this disc brake apparatus is substantially the same as that of the above-mentioned first embodiment except that the switching holding means in the first embodiment is changed so as to be constituted by a closed hydraulic circuit, similar constituents will be referred to with the same numerals or letters while omitting their detailed explanations.

Figure 22:
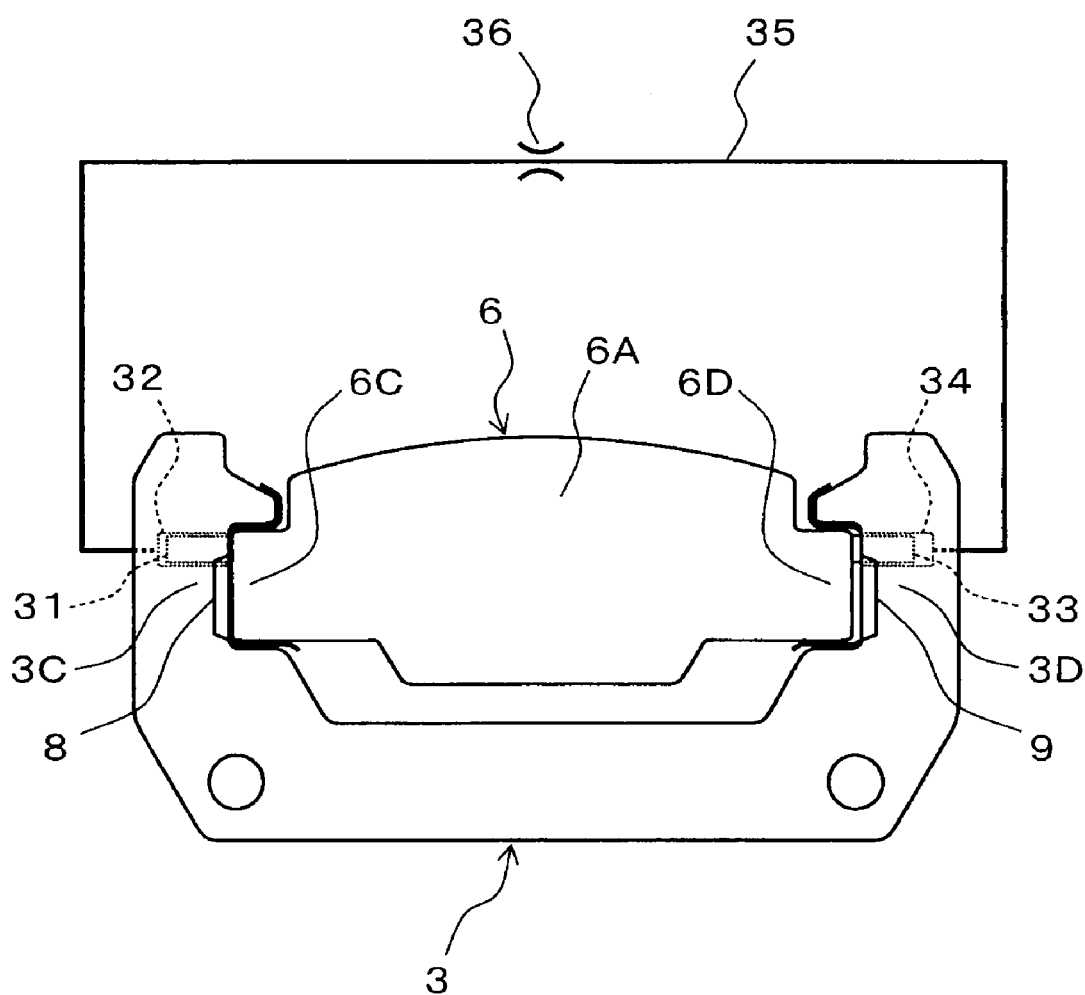
FIG. 22 is a side view showing the switching holding means in the disc brake apparatus in accordance with a fifth embodiment.

The switching holding means of the disc brake apparatus in accordance with the fifth embodiment is constructed as shown in FIG. 22, for example. Namely, the first torque receiving part 3C of the torque member 3 is formed with a first hydraulic cylinder 32 in which a first piston 31 for pressing the first torque transmission part 6C of the backing metal 6A of the brake pad 6 is inserted, while the second torque receiving part 3D of the torque member 3 is formed with a second hydraulic cylinder 34 in which a second piston 33 for pressing the second torque transmission part 6D of the backing metal 6A of the brake pad 6 is inserted. An orifice 36 is provided in a closed hydraulic circuit 35 communicating the first and second hydraulic cylinders 32, 34 to each other.

When the first torque transmission part 6C of the backing metal 6A of the brake pad 6 moves toward the first torque receiving part 3C of the torque member 3 upon forward braking of the vehicle, the first piston 31 gradually contracts, while the second piston 33 gradually expands, whereby the disc brake apparatus of the fifth embodiment is held in the above-mentioned first contract state. As a result, the first torque transmission part 6C of the backing metal 6A of the brake pad 6 does not collide with the first torque receiving part 3C of the torque member 3 at the time of forward braking of the vehicle, whereby clunking sounds are securely suppressed at the time of forward braking of the vehicle.

When the second torque transmission part 6D of the backing metal 6A of the brake pad 6 moves toward the second torque receiving part 3D of the torque member 3 upon back braking of the vehicle, by contrast, the second piston 33 gradually contracts, while the first piston 31 gradually expands, whereby the disc brake apparatus is held in the above-mentioned second contract state. As a result, the second torque transmission part 6D of the backing metal 6A of the brake pad 6 does not collide with the second torque receiving part 3D of the torque member 3 at the time of back braking of the vehicle, whereby clunking sounds are securely suppressed at the time of back braking of the vehicle.

Figure 23:
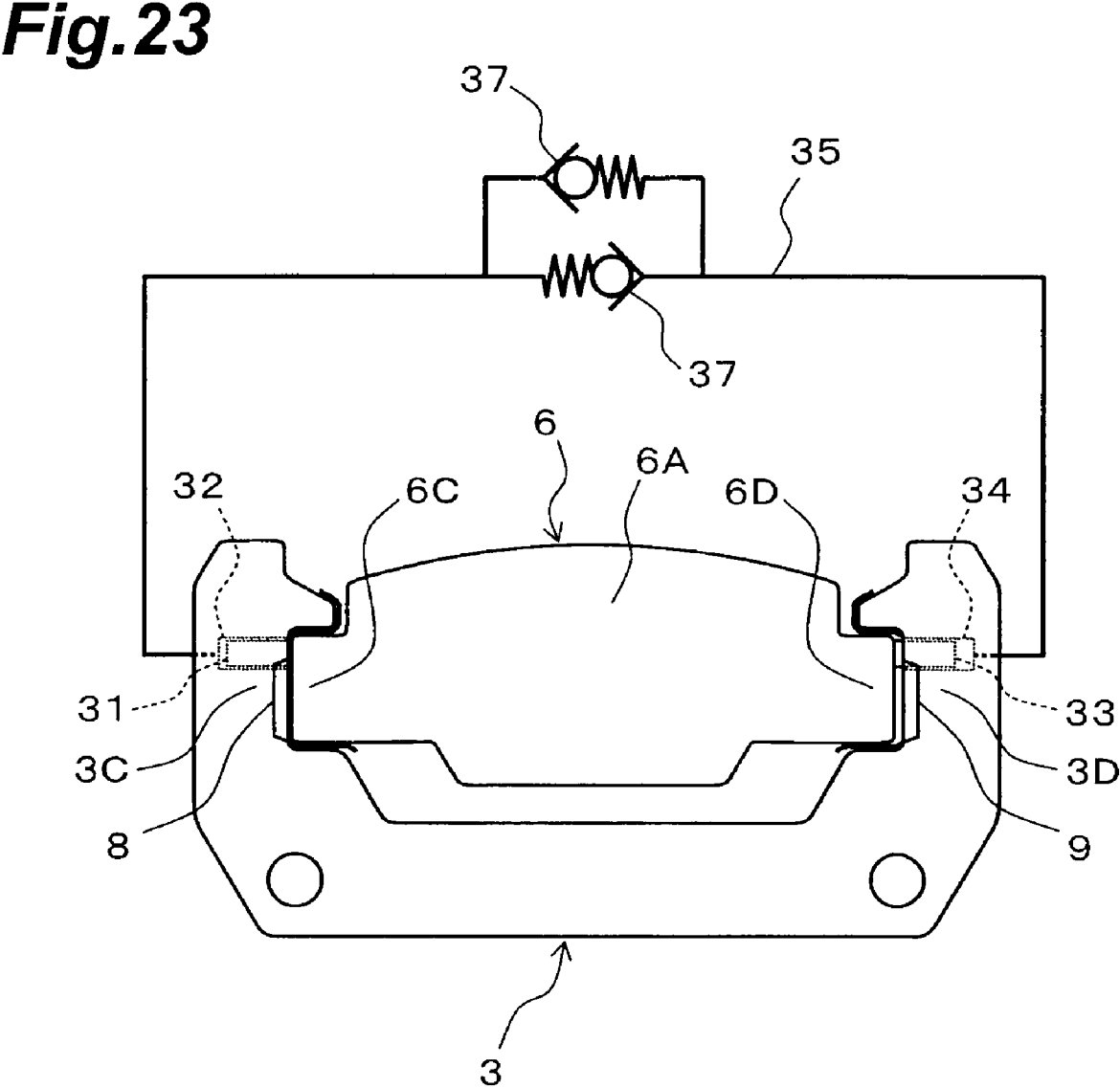
FIG. 23 is a side view showing a modified example of the switching holding means in the disc brake apparatus in accordance with the fifth embodiment

In the closed hydraulic circuit communicating the first and second hydraulic cylinders 32, 34 to each other in the disc brake apparatus of the fifth embodiment, a pair of relief valves 37, 37 may be connected in reverse to each other in series in place of the orifice 36 as shown in FIG. 23, for example. Similar effects can be obtained in this case as well.

The disc brake apparatus of the present invention can be employed not only for vehicles but also for braking rotary parts in various mechanical apparatus.

INDUSTRIAL APPLICABILITY

The disc brake apparatus in accordance with the present invention can securely suppress clunking sounds not only at the time of normal braking of the disc rotor (forward braking of the vehicle) but also at the time of reverse braking of the disc rotor (back braking of the vehicle).

The invention claimed is:

1. A disc brake apparatus constructed to transmit a torque from a first torque transmission part of a brake pad to a first torque receiving part of a torque member at the time of normal braking of a disc rotor and transmit a torque from a second torque transmission part of the brake pad to a second torque receiving part of the torque member at the time of reverse braking of the disc rotor;

the disc brake apparatus including switching holding means for holding the disc brake apparatus in a first contact state where the first torque transmission part of the brake pad abuts against the first torque receiving part of the torque member along with an operation for normal braking of the disc rotor, and switching the disc brake apparatus to and holding a second contact state where the first torque transmission part of the brake pad is moved away from the first torque receiving part and the second torque transmission part of the brake pad abuts against the second torque receiving part of the torque member along with an operation for reverse braking of the disc rotor;

wherein the switching holding means includes a spring piece provided with at least one of first and second pad retainers respectively attached to the first and second torque receiving parts of the torque member, and an engaging projection provided with the brake pad so as to correspond to the spring piece; and wherein the spring piece rides over the engaging projection by a sloping engagement, so as to selectively bias the engaging projection toward the first torque receiving part or second torque receiving part, thereby switching the disc brake apparatus to and holding the first or second contact state.

2. A disc brake apparatus according to claim 1, wherein the engaging projection is recessed into the brake pad with first and second engaging recesses provided on opposing sides of the engaging projection; and wherein the switching holding means holds the disc brake apparatus in the first contact state by an engagement between the spring piece and the first engaging recess, and switches the disc brake apparatus to and holds the second contact state by an engagement between the spring piece and second engaging recess.

3. A disc brake apparatus constructed to transmit a torque from a first torque transmission part of a brake pad to a first torque receiving part of a torque member at the time of normal braking of a disc rotor and transmit a torque from a second torque transmission part of the brake pad to a second torque receiving part of the torque member at the time of reverse braking of the disc rotor;

the disc brake apparatus including a switching holding device to hold the disc brake apparatus in a first contact state where the first torque transmission part of the brake pad abuts against the first torque receiving part of the torque member along with an operation for normal braking of the disc rotor, and to switch the disc brake apparatus to and hold a second contact state where the first torque transmission part of the brake pad is moved away from the first torque receiving part and the second torque transmission part of the brake pad abuts against the second torque receiving part of the torque member along with an operation for reverse braking of the disc rotor;

wherein the switching holding device includes a spring piece provided with at least one of first and second pad retainers respectively attached to the first and second torque receiving parts of the torque member, and an engaging projection provided with the brake pad so as to correspond to the spring piece; and wherein the spring piece rides over the engaging projection by a sloping engagement, so as to selectively bias the engaging projection toward the first torque receiving part or second torque receiving part, thereby switching the disc brake apparatus to and holding the first or second contact state.

* * * * *